(12) United States Patent
Gratton et al.

(10) Patent No.: US 10,021,448 B2
(45) Date of Patent: Jul. 10, 2018

(54) SPORTS BAR MODE AUTOMATIC VIEWING DETERMINATION

(71) Applicant: DISH Technologies L.L.C., Englewood, CO (US)

(72) Inventors: Max Stephen Gratton, Lakewood, CO (US); Christopher Boyd Tirpak, Monument, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 15/359,359

(22) Filed: Nov. 22, 2016

(65) Prior Publication Data

US 2018/0146240 A1 May 24, 2018

(51) Int. Cl.
| | |
|---|---|
| *H04N 7/18* | (2006.01) |
| *H04N 21/436* | (2011.01) |
| *H04N 21/45* | (2011.01) |
| *H04N 21/482* | (2011.01) |
| *H04N 21/438* | (2011.01) |

(Continued)

(52) U.S. Cl.
CPC ... *H04N 21/43615* (2013.01); *H04N 21/4104* (2013.01); *H04N 21/4383* (2013.01); *H04N 21/4532* (2013.01); *H04N 21/472* (2013.01); *H04N 21/478* (2013.01); *H04N 21/4826* (2013.01); *H04N 21/2543* (2013.01)

(58) Field of Classification Search
None
See application file for complete search history.

(56) References Cited

U.S. PATENT DOCUMENTS

| | | | |
|---|---|---|---|
| 6,005,562 A | 12/1999 | Shiga et al. | |
| 6,177,931 B1 | 1/2001 | Alexander et al. | |

(Continued)

FOREIGN PATENT DOCUMENTS

| | | | |
|---|---|---|---|
| EP | 1 865 716 A2 | 12/2007 | |
| EP | 2 309 733 B1 | 4/2011 | |

(Continued)

OTHER PUBLICATIONS

U.S. Appl. No. 15/218,321, filed Jul. 25, 2016 Non-Final Rejection dated May 26, 2017, all pages.

(Continued)

*Primary Examiner* — Fred Peng
(74) *Attorney, Agent, or Firm* — Kilpatrick Townsend & Stockton LLP

(57) ABSTRACT

Described herein are methods and systems for automatically selecting television channels for display on one or more televisions based on the viewing preferences of the viewers. The viewers can enter their viewing preferences in a database through a user interface that a controller can access. The controller can receive, for a premises (e.g., a sports bar), a list of viewers. Based on the viewing preferences of the list of viewers, the controller can determine a single or a ranked list of television channels for display on the televisions. If there are multiple televisions, the controller can assign each of the televisions a television channel from the ranked list based on the ranking. The controller can send an instruction to the STB controlling the television(s) to set the assigned television channel to the assigned television.

16 Claims, 7 Drawing Sheets

(51) Int. Cl.
*H04N 21/41* (2011.01)
*H04N 21/472* (2011.01)
*H04N 21/478* (2011.01)
*H04N 21/2543* (2011.01)

(56) References Cited

U.S. PATENT DOCUMENTS

| | | |
|---|---|---|
| 6,681,396 B1 | 1/2004 | Bates et al. |
| 7,174,512 B2 | 2/2007 | Martin et al. |
| 7,197,715 B1 | 3/2007 | Valeria |
| 7,633,887 B2 | 12/2009 | Panwar et al. |
| 7,680,894 B2 | 3/2010 | Diot et al. |
| 7,774,811 B2 | 8/2010 | Poslinski et al. |
| 7,818,368 B2 | 10/2010 | Yang et al. |
| 7,825,989 B1 | 11/2010 | Greenberg |
| 7,849,487 B1 | 12/2010 | Vosseller |
| 8,024,753 B1 | 9/2011 | Kummer et al. |
| 8,046,798 B1 | 10/2011 | Schlack et al. |
| 8,079,052 B2 | 12/2011 | Chen et al. |
| 8,104,065 B2 | 1/2012 | Aaby et al. |
| 8,209,713 B1 | 6/2012 | Lai et al. |
| 8,296,797 B2 | 10/2012 | Olstad et al. |
| 8,312,486 B1 | 11/2012 | Briggs et al. |
| 8,424,041 B2 | 4/2013 | Candelore et al. |
| 8,427,356 B1 | 4/2013 | Satish |
| 8,627,349 B2 | 1/2014 | Kirby et al. |
| 8,689,258 B2 | 4/2014 | Kemp |
| 8,752,084 B1 | 6/2014 | Lai et al. |
| 8,973,038 B2 | 3/2015 | Gratton |
| 8,973,068 B2 | 3/2015 | Kotecha et al. |
| 8,990,418 B1 | 3/2015 | Bragg et al. |
| 9,038,127 B2 | 5/2015 | Hastings et al. |
| 9,066,156 B2 | 6/2015 | Kapa |
| 9,213,986 B1 | 12/2015 | Buchheit et al. |
| 9,253,533 B1 | 2/2016 | Morgan et al. |
| 9,264,779 B2 | 2/2016 | Kirby et al. |
| 9,420,333 B2 | 8/2016 | Martch et al. |
| 2001/0013123 A1 | 8/2001 | Freeman et al. |
| 2001/0026609 A1 | 10/2001 | Weinstein et al. |
| 2002/0059610 A1 | 5/2002 | Ellis |
| 2002/0067376 A1 | 6/2002 | Martin et al. |
| 2002/0075402 A1 | 6/2002 | Robson et al. |
| 2002/0166122 A1 | 11/2002 | Kikinis et al. |
| 2002/0174430 A1 | 11/2002 | Ellis et al. |
| 2002/0178444 A1 | 11/2002 | Trajkovic et al. |
| 2003/0023742 A1 | 1/2003 | Allen et al. |
| 2003/0056220 A1 | 3/2003 | Thornton et al. |
| 2003/0066077 A1 | 4/2003 | Gutta et al. |
| 2003/0118014 A1 | 6/2003 | Iyer et al. |
| 2003/0126605 A1 | 7/2003 | Betz et al. |
| 2003/0126606 A1 | 7/2003 | Buczak et al. |
| 2003/0188317 A1 | 10/2003 | Liew et al. |
| 2003/0189674 A1 | 10/2003 | Inoue et al. |
| 2003/0208763 A1 | 11/2003 | McElhatten et al. |
| 2003/0229899 A1 | 12/2003 | Thompson et al. |
| 2004/0181807 A1 | 9/2004 | Theiste et al. |
| 2005/0030977 A1 | 2/2005 | Casey et al. |
| 2005/0044570 A1 | 2/2005 | Poslinski |
| 2005/0071865 A1 | 3/2005 | Martins |
| 2005/0125302 A1 | 6/2005 | Brown et al. |
| 2005/0152565 A1 | 7/2005 | Jouppi et al. |
| 2005/0166230 A1 | 7/2005 | Gaydou et al. |
| 2005/0180568 A1 | 8/2005 | Krause |
| 2005/0191041 A1 | 9/2005 | Braun et al. |
| 2005/0240961 A1 | 10/2005 | Jerding et al. |
| 2005/0264705 A1 | 12/2005 | Kitamura |
| 2006/0020962 A1 | 1/2006 | Stark et al. |
| 2006/0085828 A1 | 4/2006 | Dureau et al. |
| 2006/0174277 A1 | 8/2006 | Sezan et al. |
| 2006/0190615 A1 | 8/2006 | Panwar et al. |
| 2006/0238656 A1 | 10/2006 | Chen et al. |
| 2006/0253581 A1 | 11/2006 | Dixon et al. |
| 2006/0282852 A1 | 12/2006 | Purpura et al. |
| 2006/0282869 A1 | 12/2006 | Plourde, Jr. |
| 2007/0033616 A1 | 2/2007 | Gutta |
| 2007/0058930 A1 | 3/2007 | Iwamoto |
| 2007/0074256 A1 | 3/2007 | Jung et al. |
| 2007/0083901 A1 | 4/2007 | Bond |
| 2007/0124773 A1 | 5/2007 | Morris |
| 2007/0127894 A1 | 6/2007 | Ando et al. |
| 2007/0146554 A1 | 6/2007 | Strickland et al. |
| 2007/0154163 A1 | 7/2007 | Cordray |
| 2007/0154169 A1 | 7/2007 | Cordray et al. |
| 2007/0157235 A1 | 7/2007 | Teunissen |
| 2007/0157249 A1 | 7/2007 | Cordray et al. |
| 2007/0157253 A1 | 7/2007 | Ellis et al. |
| 2007/0188655 A1 | 8/2007 | Ohta |
| 2007/0199040 A1 | 8/2007 | Kates |
| 2007/0204302 A1 | 8/2007 | Calzone |
| 2007/0220551 A1 | 9/2007 | Shanks et al. |
| 2007/0226766 A1 | 9/2007 | Poslinski et al. |
| 2007/0245379 A1 | 10/2007 | Agnihortri |
| 2008/0022012 A1 | 1/2008 | Wang |
| 2008/0060006 A1 | 3/2008 | Shanks et al. |
| 2008/0086743 A1 | 4/2008 | Cheng et al. |
| 2008/0097949 A1 | 4/2008 | Kelly et al. |
| 2008/0109307 A1 | 5/2008 | Ullah |
| 2008/0134043 A1 | 6/2008 | Georgis et al. |
| 2008/0163305 A1 | 7/2008 | Johnson et al. |
| 2008/0195457 A1 | 8/2008 | Sherman et al. |
| 2008/0235348 A1 | 9/2008 | Dasgupta |
| 2008/0239169 A1 | 10/2008 | Moon et al. |
| 2008/0300982 A1 | 12/2008 | Larson et al. |
| 2008/0320523 A1 | 12/2008 | Morris et al. |
| 2009/0044217 A1 | 2/2009 | Lutterbach et al. |
| 2009/0055385 A1 | 2/2009 | Jeon et al. |
| 2009/0102984 A1 | 4/2009 | Arling et al. |
| 2009/0138902 A1 | 5/2009 | Kamen |
| 2009/0178071 A1 | 7/2009 | Whitehead |
| 2009/0234828 A1 | 9/2009 | Tu |
| 2009/0249412 A1 | 10/2009 | Bhogal et al. |
| 2009/0293093 A1 | 11/2009 | Igarashi |
| 2009/0299824 A1 | 12/2009 | Barnes, Jr. |
| 2009/0325523 A1 | 12/2009 | Choi |
| 2010/0040151 A1 | 2/2010 | Garrett |
| 2010/0071007 A1 | 3/2010 | Meijer |
| 2010/0071062 A1 | 3/2010 | Choyi et al. |
| 2010/0089996 A1 | 4/2010 | Koplar |
| 2010/0115554 A1 | 5/2010 | Drouet et al. |
| 2010/0122294 A1 | 5/2010 | Craner |
| 2010/0146560 A1 | 6/2010 | Bonfrer |
| 2010/0153983 A1 | 6/2010 | Philmon et al. |
| 2010/0153999 A1 | 6/2010 | Yates |
| 2010/0158479 A1 | 6/2010 | Craner |
| 2010/0166389 A1 | 7/2010 | Knee et al. |
| 2010/0169925 A1 | 7/2010 | Takegoshi |
| 2010/0218214 A1 | 8/2010 | Fan et al. |
| 2010/0251295 A1 | 9/2010 | Amento et al. |
| 2010/0262986 A1 | 10/2010 | Adimatyam et al. |
| 2010/0269144 A1 | 10/2010 | Forsman et al. |
| 2010/0319019 A1 | 12/2010 | Zazza |
| 2010/0322592 A1 | 12/2010 | Casagrande |
| 2010/0333131 A1 | 12/2010 | Parker et al. |
| 2011/0016492 A1 | 1/2011 | Morita |
| 2011/0019839 A1 | 1/2011 | Nandury |
| 2011/0052156 A1 | 3/2011 | Kuhn |
| 2011/0072448 A1 | 3/2011 | Stiers et al. |
| 2011/0109801 A1 | 5/2011 | Thomas et al. |
| 2011/0202956 A1 | 8/2011 | Connelly et al. |
| 2011/0206342 A1 | 8/2011 | Thompson et al. |
| 2011/0239249 A1 | 9/2011 | Murison et al. |
| 2011/0243533 A1 | 10/2011 | Stern et al. |
| 2011/0252451 A1 | 10/2011 | Turgeman et al. |
| 2011/0286721 A1 | 11/2011 | Craner |
| 2011/0289410 A1 | 11/2011 | Paczkowski et al. |
| 2011/0293113 A1 | 12/2011 | McCarthy |
| 2011/0314502 A1* | 12/2011 | Levy .................. H04N 7/106 725/46 |
| 2012/0020641 A1 | 1/2012 | Sakaniwa et al. |
| 2012/0052941 A1 | 3/2012 | Mo |
| 2012/0060178 A1 | 3/2012 | Minakuchi et al. |
| 2012/0106932 A1 | 5/2012 | Grevers, Jr. |
| 2012/0131613 A1 | 5/2012 | Ellis et al. |
| 2012/0185895 A1 | 7/2012 | Wong et al. |

(56) References Cited

U.S. PATENT DOCUMENTS

| | | |
|---|---|---|
| 2012/0204209 A1 | 8/2012 | Kubo |
| 2012/0230651 A1 | 9/2012 | Chen |
| 2012/0246672 A1 | 9/2012 | Sridhar et al. |
| 2012/0264504 A1* | 10/2012 | Gagner ............. G07F 17/323 463/25 |
| 2012/0278837 A1 | 11/2012 | Curtis et al. |
| 2012/0311633 A1 | 12/2012 | Mandrekar et al. |
| 2013/0014159 A1 | 1/2013 | Wiser et al. |
| 2013/0055304 A1 | 2/2013 | Kirby et al. |
| 2013/0061313 A1 | 3/2013 | Cullimore et al. |
| 2013/0074109 A1 | 3/2013 | Skelton et al. |
| 2013/0114940 A1 | 5/2013 | Merzon et al. |
| 2013/0128119 A1 | 5/2013 | Madathodiyil et al. |
| 2013/0145023 A1 | 6/2013 | Li et al. |
| 2013/0174196 A1 | 7/2013 | Herlein |
| 2013/0194503 A1 | 8/2013 | Yamashita |
| 2013/0243402 A1 | 9/2013 | Kummer et al. |
| 2013/0263189 A1 | 10/2013 | Garner |
| 2013/0283162 A1 | 10/2013 | Aronsson et al. |
| 2013/0298151 A1 | 11/2013 | Leske et al. |
| 2013/0332962 A1 | 12/2013 | Moritz et al. |
| 2013/0346302 A1 | 12/2013 | Purves et al. |
| 2014/0032709 A1 | 1/2014 | Saussy et al. |
| 2014/0068675 A1 | 3/2014 | Mountain |
| 2014/0123160 A1 | 5/2014 | van Coppenolle et al. |
| 2014/0139555 A1 | 5/2014 | Levy |
| 2014/0140680 A1 | 5/2014 | Jo |
| 2014/0153904 A1 | 6/2014 | Adimatyam et al. |
| 2014/0157327 A1 | 6/2014 | Roberts et al. |
| 2014/0195675 A1 | 7/2014 | Silver |
| 2014/0215539 A1 | 7/2014 | Chen et al. |
| 2014/0282714 A1 | 9/2014 | Hussain |
| 2014/0282741 A1 | 9/2014 | Shoykhet |
| 2014/0282745 A1 | 9/2014 | Chipman et al. |
| 2014/0282759 A1 | 9/2014 | Harvey et al. |
| 2014/0294201 A1 | 10/2014 | Johnson et al. |
| 2014/0310819 A1 | 10/2014 | Cakarel et al. |
| 2014/0313341 A1 | 10/2014 | Stribling |
| 2014/0325556 A1 | 10/2014 | Hoang et al. |
| 2014/0331260 A1 | 11/2014 | Gratton |
| 2014/0333841 A1 | 11/2014 | Steck |
| 2014/0351045 A1 | 11/2014 | Abihssira et al. |
| 2014/0373079 A1 | 12/2014 | Friedrich et al. |
| 2015/0003814 A1 | 1/2015 | Miller |
| 2015/0020097 A1 | 1/2015 | Freed et al. |
| 2015/0040176 A1 | 2/2015 | Hybertson et al. |
| 2015/0058890 A1 | 2/2015 | Kapa |
| 2015/0095932 A1 | 4/2015 | Ren |
| 2015/0118992 A1 | 4/2015 | Wyatt et al. |
| 2015/0121431 A1* | 4/2015 | Jacoby ............. H04N 21/251 725/59 |
| 2015/0181132 A1 | 6/2015 | Kummer et al. |
| 2015/0181279 A1 | 6/2015 | Martch et al. |
| 2015/0249803 A1 | 9/2015 | Tozer et al. |
| 2015/0249864 A1 | 9/2015 | Tang et al. |
| 2015/0310725 A1 | 10/2015 | Koskan et al. |
| 2015/0334461 A1 | 11/2015 | Yu |
| 2015/0350729 A1 | 12/2015 | Reynolds |
| 2016/0066020 A1 | 3/2016 | Mountain |
| 2016/0066026 A1 | 3/2016 | Mountain |
| 2016/0066049 A1 | 3/2016 | Mountain |
| 2016/0066056 A1 | 3/2016 | Mountain |
| 2016/0073172 A1 | 3/2016 | Sharples |
| 2016/0088351 A1 | 3/2016 | Petruzzelli et al. |
| 2016/0127763 A1* | 5/2016 | Patel ............. H04N 21/4312 348/564 |
| 2016/0191147 A1 | 6/2016 | Martch |
| 2016/0198229 A1 | 7/2016 | Keipert |
| 2016/0309212 A1 | 10/2016 | Martch et al. |

FOREIGN PATENT DOCUMENTS

| | | | |
|---|---|---|---|
| EP | 2 403 239 A1 | 1/2012 | |
| FR | 2 902 568 A1 | 12/2007 | |
| JP | H10 322622 A | 12/1998 | |
| JP | 2006-245745 A | 9/2006 | |
| KR | 2004 0025073 A | 3/2004 | |
| KR | 2006 0128295 A | 12/2006 | |
| WO | 98/37694 A1 | 8/1998 | |
| WO | 2005/059807 A2 | 6/2005 | |
| WO | 2007/064987 A2 | 7/2007 | |
| WO | 2007/098067 A1 | 8/2007 | |
| WO | 2009/073925 A1 | 6/2009 | |
| WO | 2013/016626 A1 | 1/2013 | |
| WO | 2014/072742 A1 | 5/2014 | |
| WO | 2014/179017 A1 | 11/2014 | |
| WO | 2016/030384 | 3/2016 | |
| WO | 2016/030477 A1 | 3/2016 | |
| WO | 2016/034899 A1 | 3/2016 | |
| WO | 2016/055761 A2 | 4/2016 | |

OTHER PUBLICATIONS

U.S. Appl. No. 14/200,864, filed Mar. 7, 2014, Non-Final Office Action dated Dec. 5, 2014, 35 pages.

U.S. Appl. No. 14/200,864, filed Mar. 7, 2014 Non-Final Office Action dated Feb. 18, 2016, 61 pages.

U.S. Appl. No. 14/479,007, filed Sep. 5, 2014, Final Office Action dated Feb. 22, 2016, 37 pages.

U.S. Appl. No. 14/139,420, filed Dec. 23, 2013 Notice of Allowance dated Mar. 31, 2016, 37 pages.

U.S. Appl. No. 14/470,392, filed Aug. 27, 2014 Final Office Action dated Mar. 4, 2016, all pages.

U.S. Appl. No. 14/095,860, filed Dec. 3, 2013 Non-Final Office Action dated Dec. 26, 2014, 45 pages.

U.S. Appl. No. 13/886,873, filed May 3, 2013, Notice of Allowance dated Oct. 24, 2014, 40 pages.

U.S. Appl. No. 13/919,702, filed Jun. 17, 2013 Final Office Action dated Nov. 18, 2014, 24 pages.

International Search Report and Written Opinion of PCT/US2014/033796 dated Sep. 5, 2014, 12 pages.

U.S. Appl. No. 13/971,579, filed Aug. 20, 2013 Non Final Office Action dated Oct. 28, 2014, 35 pages.

Extended European Search Report for EP 14160140.1 dated Jul. 7, 2014, 7 pages.

Extended European Search Report for EP 11166892.7 dated Oct. 6, 2011, 7 pages.

U.S. Appl. No. 13/942,451, filed Jul. 15, 2013 Non Final Office Action dated Jul. 28, 2014, 27 pages.

U.S. Appl. No. 13/919,702, filed Jun. 17, 2013 Non Final Office Action dated Jun. 11, 2014, 25 pages.

Office Action for EP 14160140.1 dated Jan. 19, 2016, 5 pages.

International Search Report and Written Opinion for PCT/EP2015/069461 dated Oct. 1, 2015, 13 pages.

International Search Report and Written Opinion for PCT/EP2015/069456 dated Oct. 5, 2015, all pages.

International Preliminary Report on Patentability for PCT/US2014/033796 dated Nov. 3, 2015, all pages.

International Search Report and Written Opinion for PCT/EP2015/069681 dated Nov. 23, 2015, 12 pages.

International Search Report and Written Opinion for PCT/GB2015/052570 dated Dec. 11, 2015, 13 pages.

U.S. Appl. No. 14/470,279, filed Aug. 27, 2014, Final Office Action dated Jan. 22, 2016, 25 pages.

U.S. Appl. No. 14/591,474, filed Jan. 7, 2015, Non-Final Office Action dated Feb. 12, 2016, 32 pages.

U.S. Appl. No. 14/494,079, filed Sep. 23, 2014, Preinterview first office action dated Feb. 10, 2016, 6 pages.

U.S. Appl. No. 14/095,860, filed Dec. 3, 2013 Notice of Allowance dated Oct. 19, 2015, 14 pages.

U.S. Appl. No. 13/942,451, filed Jul. 15, 2013 Non Final Office Action dated Jan. 8, 2016, 41 pages.

U.S. Appl. No. 13/919,702, filed Jun. 17, 2013 Final Office Action dated Dec. 31, 2015, 30 pages.

U.S. Appl. No. 14/071,613, filed Nov. 4, 2013 Final Office Action dated Oct. 8, 2015, 11 pages.

(56) References Cited

OTHER PUBLICATIONS

U.S. Appl. No. 14/470,392, filed Aug. 27, 2014 Non Final Office Action dated Nov. 5, 2015, 31 pages.
U.S. Appl. No. 14/470,415, filed Aug. 27, 2014 Non Final Office Action dated Nov. 18, 2015, 28 pages.
U.S. Appl. No. 14/470,248, filed Aug. 27, 2014, Final Office Action dated Feb. 16, 2016, 26 pages.
U.S. Appl. No. 14/470,248, filed Aug. 27, 2014, Preinterview first office action dated Sep. 4, 2015, 22 pages.
U.S. Appl. No. 14/470,279, filed Aug. 27, 2014, Preinterview first office action dated Aug. 26, 2015, 23 pages.
U.S. Appl. No. 14/479,007, filed Sep. 5, 2014, Non-Final Office Action dated Sep. 1, 2015, 44 pages.
U.S. Appl. No. 14/200,864, filed Mar. 7, 2014 Final Office Action dated Jun. 18, 2015, 36 pages.
U.S. Appl. No. 14/095,860, filed Dec. 3, 2013 Notice of Allowance dated Jul. 13, 2015, 31 pages.
Jin S H et al., "Intelligent broadcasting system and services for personalized semantic contents consumption", Expert Systems With Applications, Oxford, GB, vol. 31, No. 1, Jul. 1, 2006, pp. 164-173, XP024962718, ISSN: 0957-4174, DOI: 10.1016/J.ESWA.2005.09.021.
Sung Ho Jin et al., "Real-time content filtering for live broadcasts in TV terminals", Multimedia Tools and Applications, Kluwer Academic Publishers, BO, vol. 36, No. 3, Jun. 29, 2007 pp. 285-301, XP019578768, ISSN: 1573-7721.
European Search Report for EP 14197940.1 dated Apr. 28, 2015, 13 pages.
U.S. Appl. No. 14/139,420, filed Dec. 23, 2013 Non-Final Office Action dated Apr. 30, 2015, 27 pages.
U.S. Appl. No. 14/095,860, filed Dec. 3, 2013 Final Office Action dated May 1, 2015, 18 pages.
U.S. Appl. No. 14/071,613, filed Nov. 4, 2013 Non-Final Office Action dated May 18, 2015, 20 pages.
U.S. Appl. No. 13/971,579, filed Aug. 20, 2013 Notice of Allowance dated Feb. 27, 2015, 28 pages.
U.S. Appl. No. 13/942,451, filed Jul. 15, 2013 Final Office Action dated Apr. 30, 2015, 33 pages.
U.S. Appl. No. 13/919,702, filed Jun. 17, 2013 Non-Final Office Action dated Apr. 30, 2015, 26 pages.
U.S. Appl. No. 14/200,864, filed Mar. 7, 2014 Notice of Allowance dated Sep. 15, 2016, all pages.
U.S. Appl. No. 15/195,527, filed Jun. 28, 2016, Non-Final Rejection dated Sep. 30, 2016, all pages.
U.S. Appl. No. 13/942,451, filed Jul. 15, 2013 Non Final Office Action dated Oct. 25, 2016, all pages.
U.S. Appl. No. 13/919,702, filed Jun. 17, 2013 Final Office Action dated Oct. 28, 2016, all pages.
International Search Report and Written Opinion for PCT/GB2015/052456 dated Jun. 13, 2016, all pages.
International Preliminary Report on Patentability for PCT/GB2015/052456 dated Feb. 28, 2017, all pages.
U.S. Appl. No. 15/218,321, filed Jul. 25, 2016, Final Rejection dated Nov. 15, 2017, all pages.

* cited by examiner

SPORTS BAR MODE AUTOMATIC VIEWING DETERMINATION

CROSS-REFERENCES TO RELATED APPLICATIONS

This case is related to U.S. patent application Ser. No. 15/218,321, filed Jul. 25, 2016, entitled "PROVIDER-DEFINED LIVE MULTICHANNEL VIEWING EVENTS," which is incorporated herein by reference in its entirety for all purposes.

BACKGROUND

Selecting a television channel to watch can be difficult, especially in public establishments such as sports bars. Many public establishments, and particularly sports bars, have attempted to alleviate the issue of unhappy customers and viewers by installing multiple televisions. In some establishments, there are numerous televisions showing various programming to satiate the television viewing desires of their customers. Yet, the establishment still needs to decide which programming to show, and whether to show the same programming on more than one television. It is common to overhear a fellow customer in a sports bar ask the bartender to change the station to, for example, a different game. As soon as the television channel is changed, an inevitable groan follows from the rest of the patrons. This is generally true because it is difficult to accommodate the desires of all customers. Therefore, there is a need to resolve the need for selection of programming that accommodates the desires of the most possible customers.

BRIEF SUMMARY

A method for automatically selecting a television channel can be performed by a controller. Optionally, the controller can perform the method based on instructions stored on a memory device of the controller and executed by one or more processors of the controller. The method can include receiving an indication of users located at a premises (e.g., a sports bar) having a television. The controller can access a database containing viewing preferences for each of the users and use the viewing preferences to determine a television channel to display on the television. Once the television channel is determined, the controller can send an instruction to a set-top box ("STB") or television receiver to set the determined television channel for display on the television. Optionally, rather than a single television, multiple televisions can be located at the premises. Optionally, the controller can generate a ranked list of television channels to display based on the viewing preferences of the plurality of users. The controller can assign each of the televisions a television channel from the ranked list of television channels in ranked order and send an instruction to the STB to set the channel on each television to the assigned channel. Optionally, assigning a television channel to each television can include identifying a subset of the users that have a line of sight to each television and assigning a television channel from the ranked list that ranks highest for the subset of users in view of that television. Optionally, the ranked list of television channels can also be based on excitement data.

Optionally, the indication of the users being at the sports bar or other premises can be based on radio frequency identification ("RFID"). Each user can carry a device (e.g., a cellular phone, a VIP card, or any suitable device that can include an RFID tag or be read by an RFID reader) that can be read by an RFID reader. Upon entering the premises, the RFID reader can recognize that the user is in the premises by reading the RFID tag, and the RFID reader can provide the information to the controller.

Optionally, the programming on the television channels can be sporting events. Optionally, the users can enter their viewer preference information through a user interface (e.g., a user interface on their mobile device, a user interface on their television utilizing a remote control to enter the data, a user interface on a kiosk device located on a table of the premises, or any other device that can display a user interface). The viewer preference information can include demographic information of the user (e.g., name, address, age, and so forth) as well as fantasy team information (e.g., fantasy football information such as players), favorite sports teams, favorite sports players, specific games the user would like to view, games the user has bet or gambled on, and so forth. Optionally, the controller can determine a favorite sports team based on the user's address by selecting a local sports team as the favorite team. Optionally, the controller can utilize fantasy team information to determine specific players that can be used to determine a preferred game to watch. Optionally, the controller can determine a preferred game to watch based on a gambling pool or bet placed.

Optionally, the method can include determining a different channel for display on the television by receiving information on a second group of users located at the premises that are different than the first users. The method can include determining a second television channel to display on the television based on the viewing preferences of the second group of users and sending an instruction to the STB to change the television display to the second television channel.

Optionally, the controller can identify that a program displaying on one or more of the televisions is ending or another event of interest is beginning. Upon a program ending, the controller can request an updated list of users at the premises and generate another ranked list of television channels to display based on the viewing preferences of the updated list of users. Optionally, the controller can determine which television channel on the ranked list of television channels ranks highest but is not otherwise displayed on a different television within the premises and send an instruction to the STB to set that channel for display on the television that was displaying a program that ended. Optionally, the controller can use other factors, such as status of particular users, based on frequency of patronage or amount of money spent at the establishment, to weight choices of particular users higher than other users.

Optionally, the users can provide a payment to the service that allows that user's viewer preferences to have a higher weight in the calculation that determines which television channel to display. Optionally, the controller can determine when a commercial break is going to occur on the television channels displayed on the televisions. Upon determining that a commercial break is going to begin, the controller can send an instruction to the STB to change the television channel to a different television channel, which can be selected based on excitement data, and then turn the television channel back to the original channel when the commercial ends or when the different television channel begins a commercial break.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Many television viewers enjoy the viewing experience of watching a sports event or game in a sports bar or other public establishment. However, selection of a television program that will allow as many patrons as possible to watch their preferred programming can be challenging for the establishment. In some cases, fraternity houses or other home environments face similar challenges. While multiple televisions, picture in picture ("PIP"), or even split screen views can alleviate some of the problem by allowing viewing of more than one program at a time, selection of the most popular programs (e.g., games or sporting events) can still be difficult to achieve. The invention described herein provides solutions for that problem.

The described invention describes systems and methods for "crowd-sourcing" the decision of which television channel or channels to select. Rather than merely guessing, the preferences of each viewer can be considered and the best option can be selected based on the viewing audience. This type of selection can be used at any premises including public establishments, private environments (e.g., a single-family home), and semi-private environments (e.g., fraternity houses, nursing homes, and the like) and with any number of televisions or displays.

Figure 1:
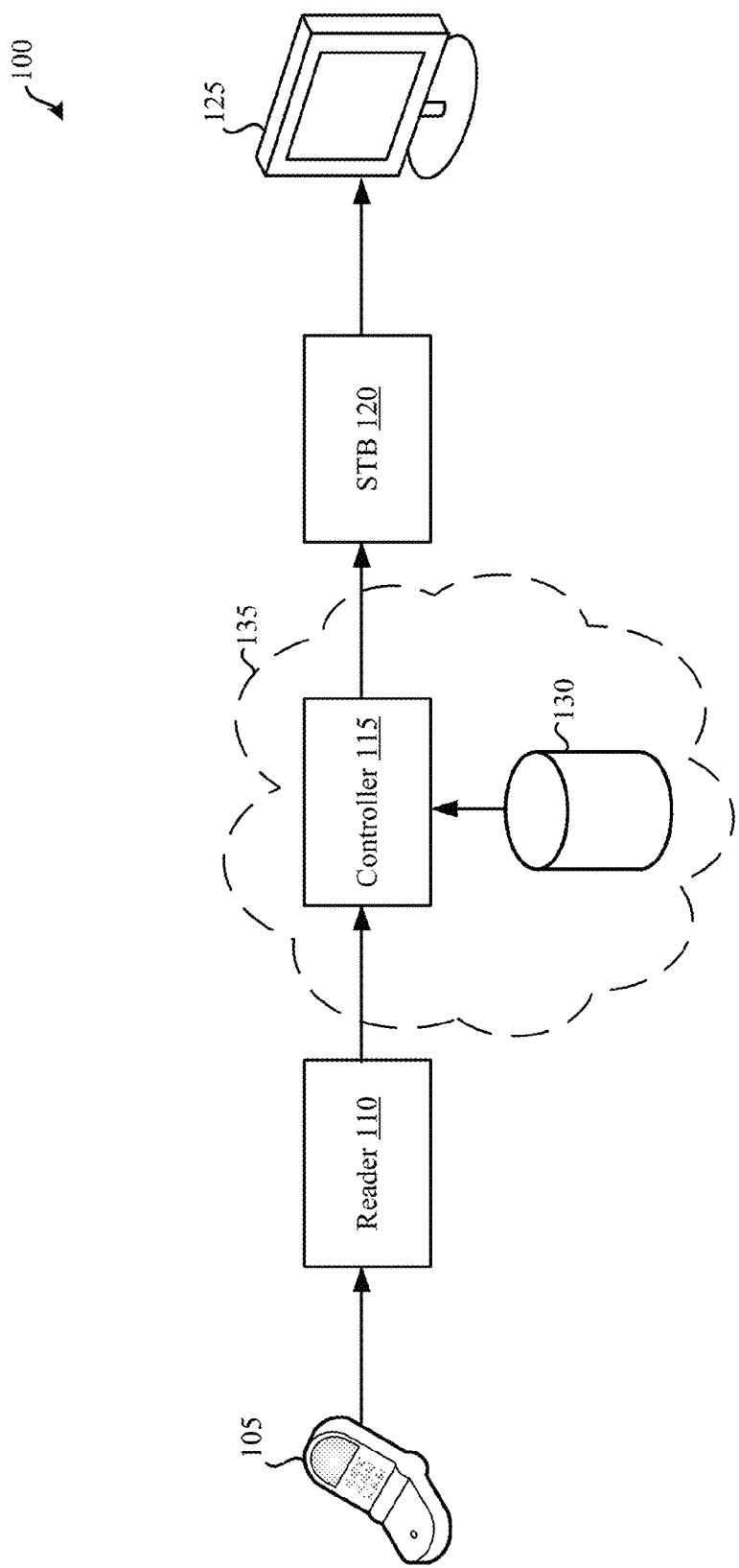
FIG. 1 illustrates an example simplified block diagram of a system for automatically selecting television channels for display based on viewer preference information.

FIG. 1 illustrates an example simplified block diagram of a system 100 for automatically selecting television channels for display based on viewer preference information. The system 100 includes a user device 105, a reader 110, a controller 115, a set-top box ("STB") 120, a television 125, a database 130, and optionally a cloud environment 135.

The user device 105 can be used to identify by reader 110 that the user is located within the premises associated with the reader 110. The user device 105 can be any suitable user device for providing location information of the user within the system 100. For example, the user device 105 can be a mobile device, a VIP card, or even a device located within the establishment.

Optionally, the user device 105 can be a mobile device of the user. A cellular telephone, a tablet computer, a smartwatch, or any other mobile device can be used. Mobile devices often contain, for example, GPS locators that can be used to provide location information of the user. A mobile device can also include a radio frequency identification ("RFID") tag that can be read by a reader, Bluetooth™ capability, or any other communication options for use with system 100. Optionally, the user device 105 can be a card or other small, system specific device such as, for example, a VIP card, a dongle, or any other device. The user device 105 can be a device that is small enough for a user to carry easily or put on, for example, his or her keychain. Such a small device like a card or dongle can include an RFID tag, or any other suitable near field communication ("NFC") device that can be used to notify a reader on the premises that the user is there.

Optionally, the user device 105 can be a device located within the establishment or premises. For example, the user device 105 could be a kiosk located at the establishment or a small tablet type device that is located on each table of the establishment. The user device 105 located within the premises can allow the user to log in to a user interface to identify himself as located at the establishment (i.e., premises).

The reader 110 can be any suitable reader for identifying the user device 105. For example, the reader 105 can be an RFID reader. As another example, the reader 110 can identify Bluetooth™ communication to recognize when the user device 105 is within the Bluetooth™ range of the reader.

Figure 5:
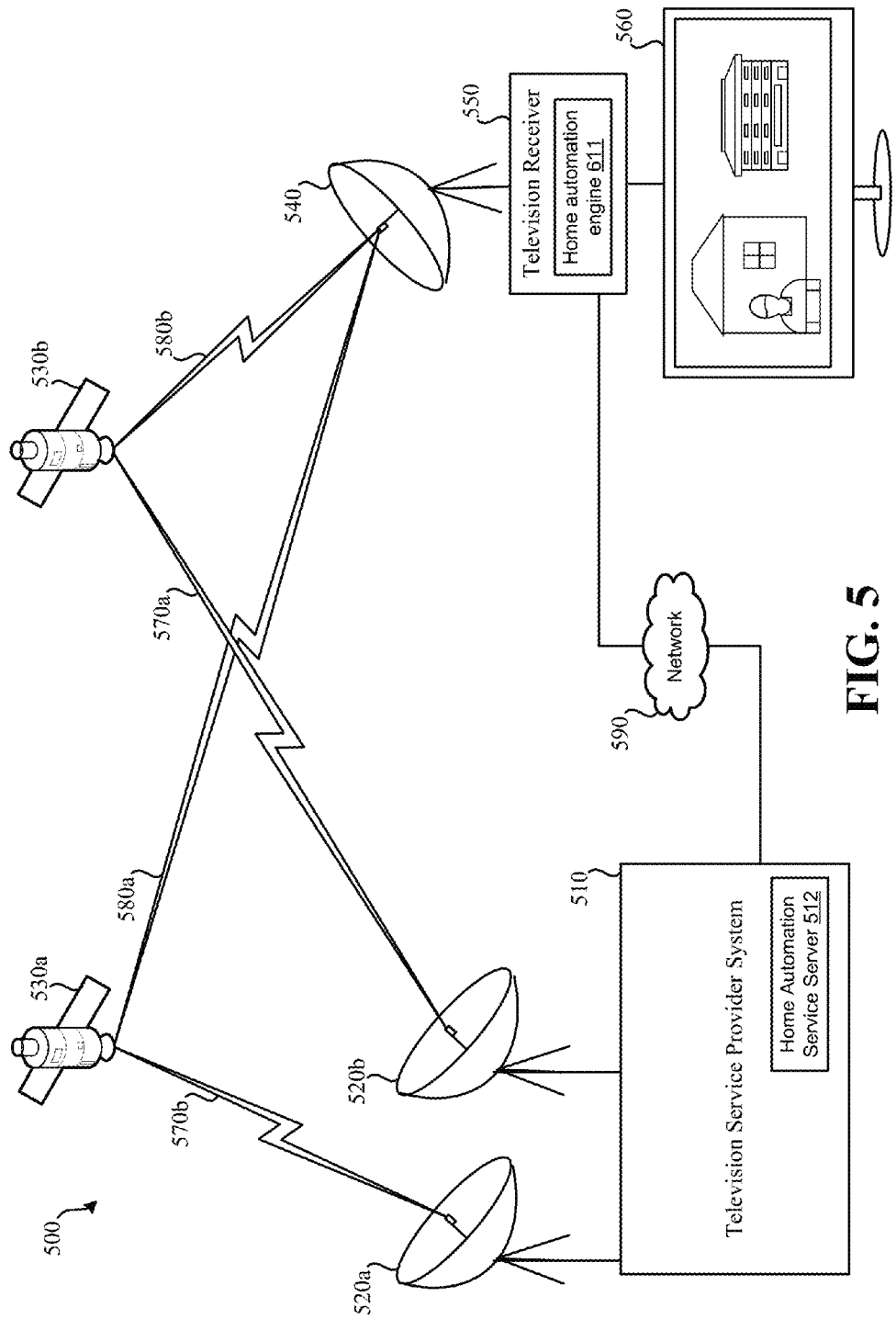
FIG. 5 illustrates an embodiment of a television service provider system that provides home automation functionality.

Controller 115 can be communicatively coupled to the reader through any suitable network such as network 590 of FIG. 5. Controller 115 can be within, for example, a cloud environment 135. Controller 115 can be any suitable computing device for processing the available information to identify television channels based on preferences of the users. An example controller can be, for example, the computer system 700 of FIG. 7.

STB 120 can be any suitable television receiver for setting channel selections for a television. STB 120 can communicate with controller 115 through any suitable network such as network 590 of FIG. 5. For example, STB 120 can be television receiver 550 of FIG. 5 or television receiver 600 of FIG. 6. While depicted separately, STB 120 and controller 115 can optionally be combined into a single computer system.

Television 125 can be any suitable television for displaying programming received via, for example, STB 120. Television 125 can be in a home, a public establishment (e.g., a sports bar, a restaurant, a hotel lobby, an airport terminal, a golf clubhouse, an airline club, and so forth), or in a semi-private environment (e.g., a fraternity house, a sorority house, an assisted living facility, a nursing home, and so forth).

Database 130 can be any suitable database used to store viewing preference information for users of the system. The data can be stored in any suitable type of database including, for example, relational, hierarchical, network, or object oriented. Database 130 can optionally be within a cloud environment 135.

In use, system 100 can allow controller 115 to select a television channel for display on television 125 based on the users located within the viewing range of television 125 (i.e., users having a line of sight to television 125). Initially, users can utilize, for example, user device 105 to enter their viewing preference information. The users can log into a user interface (not shown) to enter the information. Using the user interface, the user can create a profile containing personal information for the user. For example, the user can enter demographic information including, for example, the user's name, a handle or username for identifying the user, the user's address, the user's family information, and so forth. Additionally, the user can enter viewing preference information such as favorite television shows, topics of interest, favorite television channels, and so forth. Optionally, system 100 can be more specifically for selecting sporting games to display in a sports bar. Accordingly, other viewing preference information can include favorite sports teams, favorite sports players, fantasy team information (e.g., fantasy football roster), gambling or betting information (e.g., March Madness bracket or specific games for which a bet was placed), favorite sports generally (e.g., football, basketball, baseball, golf, wrestling, hockey, and so forth), and preferred sporting level (e.g., college, professional, and so forth). In some embodiments, user viewing preferences may be augmented by other demographic information, such as frequency of patronage at an establishment, or spending habits at the establishment, for use in weight calculations as described in further detail below.

The user interface (not shown) can be accessed through any suitable device. For example, the user interface can be hosted by the controller 115, for example, or any other computer system in communication with database 130. The user interface can then be accessed through any device that can connect over the Internet or a network with the hosting computer system. For example, the user device 105 can allow the user to enter viewer preference information through the user interface. As another example, the user can utilize a television at home to access the user interface and enter viewer preference and profile information using a television remote. As yet another example, a home computer, work computer, or any other computer can be used to access the user interface for logging in and entering or updating viewing preference information. All user profile viewing preference information can be stored in the database 130.

When the user enters the premises having television 125, the reader 110 can obtain a communication from user device 105 that the user is in the premises. For example, the user device 105 can be a VIP card having an RFID tag containing user identifying information such as the user's username or other identifier. The reader 115 can be an RFID reader that is located, for example, near the entrance door of the premises such that when the user enters the premises the reader 110 receives the user identifying information automatically from the user device 105. Other communication examples can include Bluetooth™, near field communication ("NFC"), or any other suitable communication protocol. Optionally, the reader can be located more specifically within the premises in such a way as to indicate whether the user will be in the viewing range of television 125 (i.e., have a line of sight to television 125). For example, in a sports bar or restaurant, a reader 110 can be located at each seat, which can be configured to provide range of view/line of sight information by the reader 110 to the controller 115. For example, the reader 110 can include information about the viewable televisions 125 from that seat when the user information is transmitted. As another example, the controller 115 can obtain from database 130 configuration information that associates a specific reader 110 with specific televisions 125. In some embodiments, triangulation can be performed using multiple RFID readers 110 to identify a more specific location within the premises of the user.

Controller 115 can receive the user information from reader 110. Once the controller 115 has the user information for the users to be used in the determination of which television channel to select, controller 115 can obtain the viewing preference information for each user from database 130. Controller 115 can also access television programming information through, for example a television service provider system such as television service provider system 510 of FIG. 5. Controller 115 can, for example, receive and optionally filter the television programming information. For example, controller 115 can filter out all programming that is not related to sporting events, or even more specifically can filter out all programming that is not a specific type of sporting event (e.g., football games on Sundays during football season, basketball games during March Madness, and so forth). As another example, controller 115 can filter out all programming that is within 15 minutes of ending. Any suitable filter can be used to target specific programming or types of programming. Such filters can be configured by, for example, the establishment owner through a configuration user interface accessible, for example, through STB 120. Once the controller 115 obtains the viewing preference information, optionally, the controller 115 can assign weights to the viewing preference information. Optionally, for example, users can pay for the service to weigh their preferences more heavily than a free user, or weight the preferences of users that frequent the establishment more frequently or spend more money at the establishment. As another optional example, the controller 115 can identify viewing preference information for a user indirectly and can assign a lower weight to indirectly obtained or derived preference information. For example, if the viewer preference information does not indicate a favorite football team, the controller 115 can derive the information by identifying the closest football team based on the user's address as the user's favorite football team.

Once the controller 115 has the user's viewing preference information, has weighted it if appropriate, and has the programming information that is filtered if appropriate, the controller 115 can process the data to select a television channel. The controller 115 can select the television channel that is providing programming that is most likely to be most popular with the majority of the users. As a very simplified example, if there are 20 users, 10 of which prefer football, 3 of which prefer baseball, 6 of which prefer basketball, and 1 of which prefers golf, the controller 115 can select a television channel that is currently showing a football game as its programming. Further, if there are multiple football games playing, the controller can select the football game that is most likely to be most popular with the viewers. For example, if 7 of the users prefer the Denver Broncos, and 6 other users have at least one Denver Bronco's team member on the users' fantasy football team, then the controller 115 can select the television channel showing the Denver Broncos football game as its programming. Controller 115 can employ other, more complex algorithms to make the determination of the programming that is most likely to be most popular with the majority of the users, including using the weighting discussed above. Optionally, controller 115 can generate a ranked list of television channels using the algorithm. Controller 115 can, optionally, use excitement data to determine which television channel to select or in which order to put the ranked list of television channels. Excitement data can be provided by a third party vendor (e.g., Thuuz®) and can provide information on which sporting events or programming are currently most exciting. Optionally, excitement data can be used to break a tie if two television channels are ranked equally.

Once controller 115 has selected a television channel (or a ranked list of television channels), controller 115 can send an instruction to STB 120 to set the selected television channel for display on television 125. This entire process can be repeated when, for example, the displayed programming on the television channel ends. For example, when the Denver Broncos game ends, the controller 115 can go through the process again to identify a new television channel that will be most popular with the majority of the users. In some embodiments, a manual refresh option can cause the controller 115 to begin the process and select a different television channel on demand. Optionally, the system 100 can have a configuration set for how often and under what circumstances or events to update the television channel. For example, the refresh can happen every hour (or other time increment), upon the ending of the current programming, whenever the programming comes to a commercial break, or any other suitable time or event. The configuration can be set through a user interface as discussed for the establishment or premises.

Figure 2:
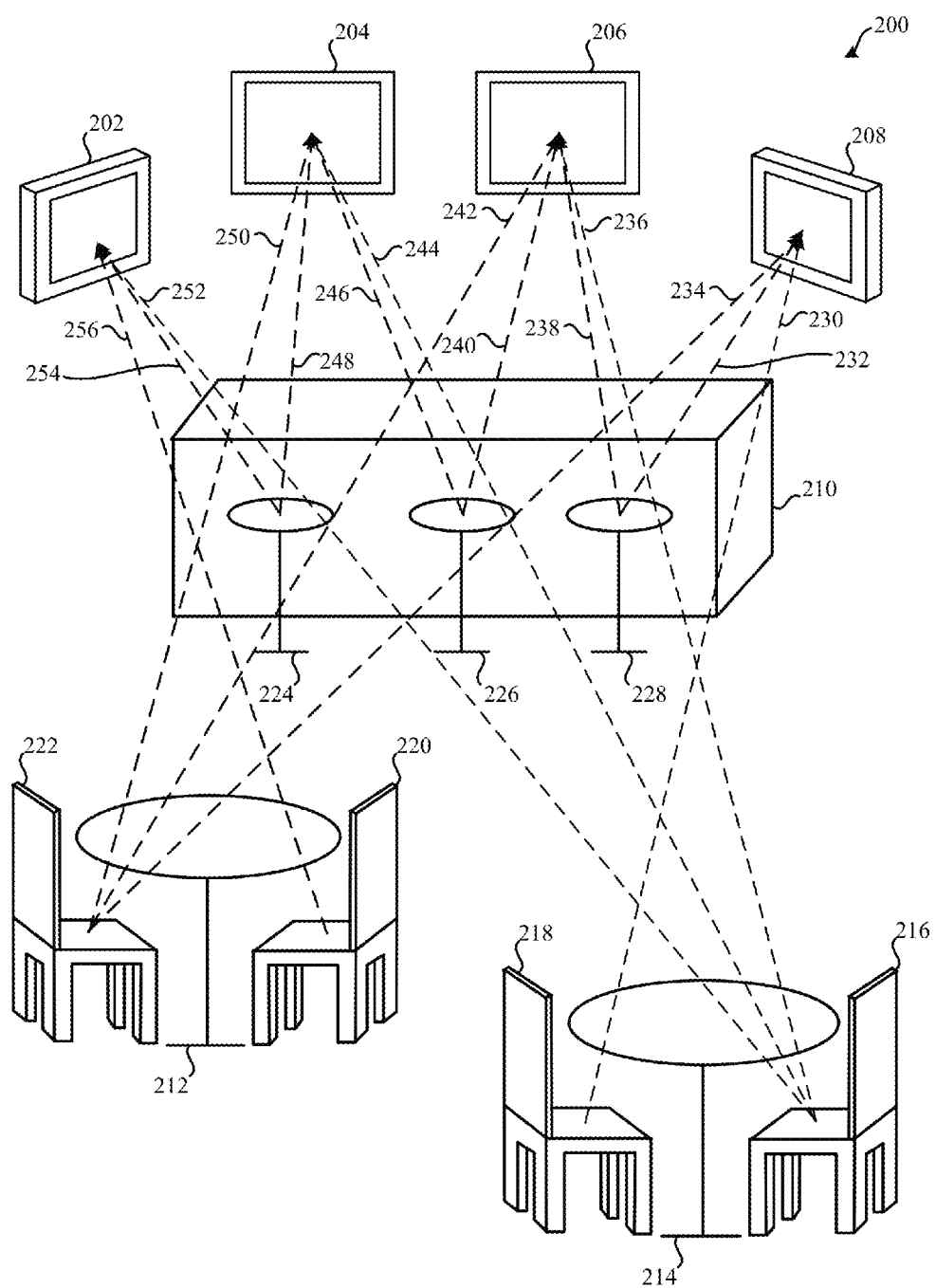
FIG. 2 illustrates an example environment and system for automatically selecting television channels for display based on viewer preference information.

FIG. 2 illustrates an example environment and system 200 for automatically selecting television channels for display based on viewer preference information. The system 200 can be, for example, in a restaurant or sports bar. System 200 includes televisions 202, 204, 206, and 208, bar 210, bar stools 224, 226, and 228, tables 212 and 214, chairs 216, 218, 220, and 222. From each of the locations in the room, there are one or more line of sights 230, 232, 234, 236, 238, 240, 242, 244, 246, 248, 250, 252, 254, and 256.

Televisions 202, 204, 206, and 208 can be the same as described television 125 of FIG. 1. While system 200 shows four (4) televisions 202, 204, 206, and 208, any number of televisions can be utilized in system 200. Further, optionally, more than one television 202, 204, 206, and 208 can display the same programming. For example, television 202 and 208 can be set to display the same television channel. Such duplication can be configured through, for example, a setting in a user interface for configuring the system 200. Such user interface can be accessible through, for example one of the televisions 202, 204, 206, and 208 using a remote control. Optionally, the controller can automatically determine if televisions 202, 204, 206, or 208 should display duplicate programming. Other components of system 100 such as controller 115, database 130, cloud environment 135, STB 120, reader 110, and user device 105 can be used within system 200. Optionally, STB 120 can control all televisions 202, 204, 206, and 208 or multiple STBs 120 can be used with, for example, a different STB 120 associated with each of the televisions 202, 204, 206, and 208.

In use, users can enter system 200. Users can sit at any of bar stools 224, 226, and 228 or chairs 216, 218, 220, and 222. Each of the seats can be associated with one or more line of sights 230, 232, 234, 236, 238, 240, 242, 244, 246, 248, 250, 252, 254, and 256. For example, a user sitting at bar stool 224 can have line of sight 254 to television 202 and line of sight 248 to television 204. While the user sitting at bar stool 224 can likely see television 208, the line of sight may be less direct and therefore discounted in the calculation for determining which television channel to select for television 208. Similarly, a user sitting at bar stool 226 can have line of sight 246 to television 204 and line of sight 240 to television 206; a user sitting at bar stool 228 can have line of sight 232 to television 208 and line of sight 238 to television 206; a user sitting at chair 216 can have line of sight 236 to television 206, line of sight 244 to television 204, and line of sight 252 to television 202; a user sitting at chair 218 can have line of sight 230 to television 208; a user sitting at chair 220 can have line of sight 256 to television 202, and a user sitting at chair 222 can have line of sight 234 to television 208, line of sight 242 to television 206, and line of sight 250 to television 204. As discussed above, various methods can be used to determine where a user is seated to determine which televisions may be most in the users line of sight. For example, triangulation with RFID can be used, a specific reader can be located at each seat, or any other suitable method can be used. Optionally, a user can provide information to indicate which television 202, 204, 206, or 208 he intends to view. For example, if the user device used to identify the user is a mobile device of the user, a notification and request for information can display, through for example the user interface application on the user's mobile device. The user interface may prompt the user to select which television 202, 204, 206, or 208 within the premises the user intends to view. That information can be provided to the controller with the user information and utilized by the controller to, for example, weight that user's viewing preference information more heavily for selection of the television channel for the selected television.

Optionally, the controller can automatically determine whether televisions 202, 204, 206, or 208 should display duplicate programming. For example, the controller can determine that a subset of users having line of sight to television 202 includes 3 users including users seated in bar stool 224 and chairs 220 and 216. The controller can also determine that a subset of users having line of sight to television 208 includes 3 users including users seated in bar stool 228 and chairs 218 and 222. Because none of those users overlap, should both subsets of users rank the same television channel as their highest, the controller can duplicate the programming on televisions 202 and 208 based on the low overlap of users and the ranking of the programming. Optionally, a threshold value (e.g., 30%) can be used for the number of users in each television subset of users that can overlap before duplication is no longer appropriate. Such a threshold value can be configured through, for example, a user interface used by a manager or employee of the establishment or the user at home.

An additional optional feature can include a manual override. For example, should the controller select a program with which many users are unhappy, the premises can allow a manager or other employee to manually change the television channel displayed on one or more of the televisions 202, 204, 206, or 208. Optionally, the configuration screen can allow the premises manager or employee to select how many and which televisions 202, 204, 206, or 208 are subject to the automatic selection of television channels and specifically remove one or more televisions 202, 204, 206, or 208 within the premises to allow for some manual selection of television channels on at least some televisions 202, 204, 206, or 208 within the premises. A similar option can be available in the semi-private or home environment as well as with PIP or split screen configurations. While most screen configurations are easily viewable with an even number of views (e.g., 2 or 4), the user may select, for example, three of the views to be selected automatically and manually select the television channel on the $4^{th}$ view. Additionally, the manager or employee (or user in a home or semi-private system) can configure the system 200 to take into consideration the programming showing on the manually overridden television. For example, the controller can filter out the television channel that is being displayed on the manually overridden channel prior to generating the ranked list of television channels.

Figure 3:
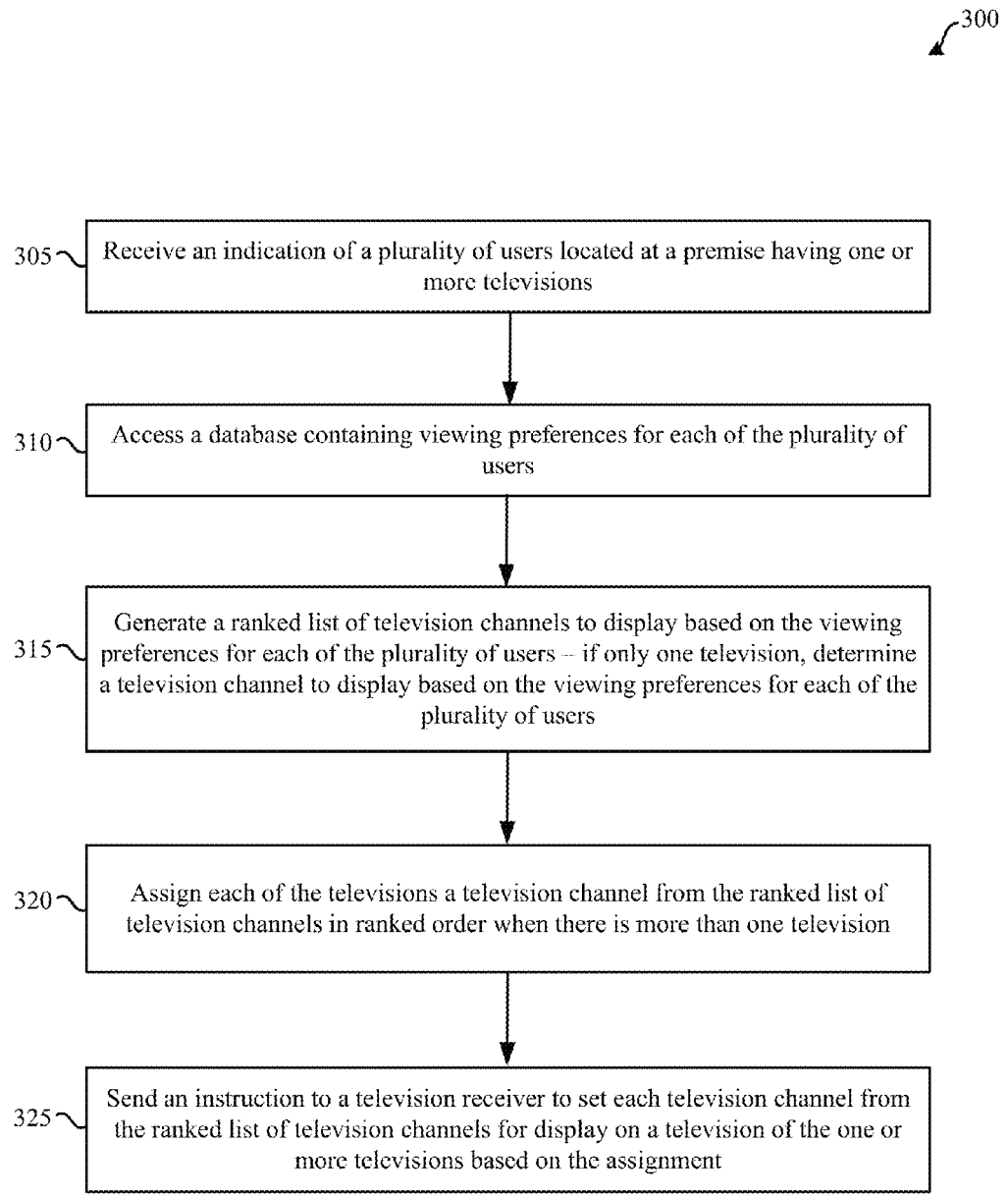
FIG. 3 illustrates an example method for selecting channels for display based on viewer preference information.

FIG. 3 illustrates a method 300 for automatically selecting a television channel based on viewing preference information. Method 300 can be performed by, for example, controller 115 of FIG. 1. Method 300 can be performed within system 100 of FIG. 1 and/or system 200 of FIG. 2. Method 300 can begin at 305 with the controller receiving an indication of a plurality of users located at a premise having one or more televisions. As discussed above, the indication can come from a reader or other device configured to communicate with the controller as well as with the user device. The user device can provide information that the user has arrived at the premises to the reader. In some cases the user device can be a device carried by the user, such as a VIP card with an RFID tag in it, or a mobile device of the user. In some cases, the user device can be a device located at the premises, such as a table side device that provides a user interface for logging in.

Once the controller has received the information indicating which users are at the premises, at 310 the controller can access a database containing viewing preferences for each of the plurality of users. The database can be database 130 of FIG. 1. The viewing preference information can include the user's demographic information, information about the user's favorite sports as previously described, information about topics of interest, information about favorite television stations, and any other suitable viewing preferences. Optionally, viewing preference information can be supplemented automatically by the user's home television system. For example, frequently watched programming can be used to derive the user's favorite sports team, favorite sports to watch, favorite television channels to watch, and so forth.

Based on the viewing preferences of the users located at the premises, at 315 the controller can generate a ranked list of television channels to display. Where only a single television is being used, the controller can determine which television channel to display based on the same information. The same information and algorithms can be used as were described with respect to FIG. 2.

At 320, when there is more than one television, the controller can assign each of the televisions a television channel from the ranked list of television channels in ranked order. The order by which the televisions are assigned the television channels can be configured, optionally. For example, the biggest television or the television in the most prominent position within the premises can be identified to be assigned first such that it shows the highest ranked programming. In systems for which television channels are selected at least partially based on the viewers for that specific television, an option for selecting the television channel for assignment to a specific television can include getting the ranked list of television channels as described above. Then, the viewing preference information for the subset of users that may be viewing the television for which an assignment is being determined can be used to determine which television channel from the ranked list of television channels ranks highest that is not already assigned to a television. Optionally, the viewing preference information for all of the users on the premises can be used with those identified as having a line of sight to the television being weighted more heavily. As previously discussed, duplication of programming on the televisions can be automatically determined based on the viewing preferences of the users having line of sight and if the other television does not have a threshold overlap of users with line of sight.

At 325, the controller can send an instruction to the STB (or all the STBs if multiple STBs are used to control the channel selection on multiple televisions) to set each television channel from the ranked list of television channels for display on a television of the one or more televisions based on the assignment. Optionally, the STB and the controller can be the same device and the instruction can instead simply be executed.

Figure 4:
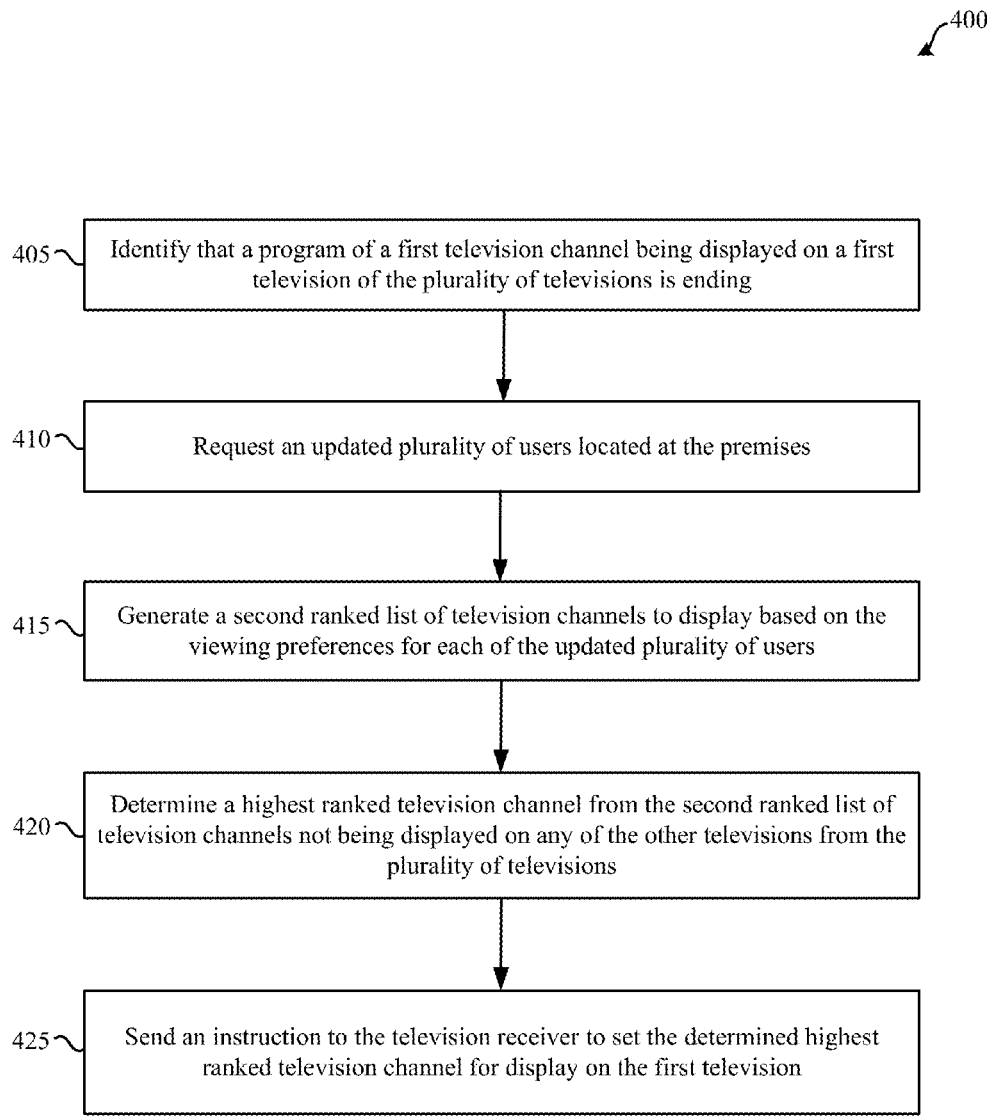
FIG. 4 illustrates another example method for selecting channels for display based on viewer preference information.

FIG. 4 illustrates another method 400 for automatically selecting channels for display based on viewer preference information. Method 400 can be performed by, for example, controller 115 of FIG. 1. Method 400 can be performed within system 100 of FIG. 1 and/or system 200 of FIG. 2. Method 400 can be performed, for example, after or with method 300 of FIG. 3. Method 400 can begin at 405 when the controller can identify that a program of a first television channel being displayed on one of the televisions is ending. For example, if a basketball game is currently playing on the television, the game may be ending and users may want to try to catch a different game or even the end of a different game that did not rank highly enough to be showing in the premises on other televisions. To ensure that the programming most likely to be wanted by the users is always showing, as soon as one program ends, another program may be selected for viewing on that television.

At 410, the controller can request an updated plurality of users located at the premises. Optionally, the STB can send a notification to the reader or other device that is supplying the current list of users, which can allow the device to send the updated list of users to the controller. Note that the list of users may have changed because, for example, at a public establishment, such as a sports bar or restaurant, users may have finished eating or had to leave for various reasons and different users may have taken their place.

At 415, the controller can generate a second ranked list of television channels to display based on the viewing preferences for each of the users from the updated list of users. The second ranked list can be generated using any of the additional information discussed above including weighting the information, excitement data, or any other data that can be used to allow the controller to select the best channels for the viewing audience.

At 420, the controller can determine a highest ranked television channel from the second ranked list of television channels that is not being displayed on any of the other televisions in the premises. This can allow the most highly ranked television channel to be displayed without duplicating a television channel already being displayed on another television. Optionally, the controller can consider the specific viewing audience of the television. Stated differently, the controller can select the most highly ranked television channel on the ranked list of television channels based on the viewer preferences of the users that have a line of sight to the television or have otherwise selected that television as the television the user is viewing. Optionally, the controller can duplicate the highest ranked television channel that does not have an overlap of users of more than a threshold value.

At 425, the controller can send an instruction to the STB to set the determined highest ranked television channel for display on the television. Optionally, method 400 can be repeated, for example, 10 minutes after the prior program ended. This may be appropriate because, for example, in a sports bar, users may stay to watch a game, but leave when it ends. Within 10 minutes of the game ending, a substantially different group of users may be the viewing audience of the television.

FIG. 5 illustrates an embodiment of a satellite television distribution system 500. While a home automation system may be incorporated with various types of television receivers, various embodiments may be part of a satellite-based television distribution system. Cable, IP-based, wireless, and broadcast focused systems are also possible. Satellite television distribution system 500 may include: television service provider system 510, satellite transmitter equipment 520, satellites 530, satellite dish 540, television receiver 550, home automation service server 512, and display device 560. The display device 560 can be controlled by, for example, a user using a remote control device that can send wired or wireless signals to communicate with the television receiver 550 and/or display device 560. Alternate embodiments of satellite television distribution system 500 may include fewer or greater numbers of components. While only one satellite dish 540, television receiver 550, and display device 560 (collectively referred to as "user equipment") are illustrated, it should be understood that multiple (e.g., tens, thousands, millions of) instances and types of user equipment may receive data and television signals from television service provider system 510 via satellites 530.

Television service provider system 510 and satellite transmitter equipment 520 may be operated by a television service provider. A television service provider may distribute television channels, on-demand programming, programming information, and/or other content/services to users. Television service provider system 510 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 520 may be used to transmit a feed of one or more television channels from television service provider system 510 to one or more satellites 530. While a single television service provider system 510 and satellite transmitter equipment 520 are illustrated as part of satellite television distribution system 500, it should be understood that multiple instances of transmitter equipment may be used, possibly scattered geographically, to communicate with satellites 530. Such multiple instances of satellite transmitting equipment may communicate with the same or with different satellites. Different television channels may be transmitted to satellites 530 from different instances of transmitting equipment. For instance, a different satellite dish of satellite transmitter equipment 520 may be used for communication with satellites in different orbital slots.

Satellites 530 may be configured to receive signals, such as streams of television channels, from one or more satellite uplinks such as satellite transmitter equipment 520. Satellites 530 may relay received signals from satellite transmitter equipment 520 (and/or other satellite transmitter equipment) to multiple instances of user equipment via transponder streams. Different frequencies may be used for uplink signals 570 from downlink signals 580. Satellites 530 may be in geosynchronous orbit. Each of the transponder streams transmitted by satellites 530 may contain multiple television channels transmitted as packetized data. For example, a single transponder stream may be a serial digital packet stream containing multiple television channels. Therefore, packets for multiple television channels may be interspersed. Further, information used by television receiver 550 for home automation functions may also be relayed to a television receiver via one or more transponder streams.

Multiple satellites 530 may be used to relay television channels from television service provider system 510 to satellite dish 540. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 530a. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 540 may be a piece of user equipment that is used to receive transponder streams from one or more satellites, such as satellites 530. Satellite dish 540 may be provided to a subscriber for use on a subscription basis to receive television channels provided by the television service provider system 510, satellite transmitter equipment 520, and/or satellites 530. Satellite dish 540, which may include one or more low noise blocks ("LNBs"), may be configured to receive transponder streams from multiple satellites and/or multiple transponders of the same satellite. Satellite dish 540 may be configured to receive television channels via transponder streams on multiple frequencies. Based on the characteristics of television receiver 550 and/or satellite dish 540, it may only be possible to capture transponder streams from a limited number of transponders concurrently. For example, a tuner of television receiver 550 may only be able to tune to a single transponder stream from a transponder of a single satellite at a given time. The tuner can then be re-tuned to another transponder of the same or a different satellite. A television receiver 550 having multiple tuners may allow for multiple transponder streams to be received at the same time.

Figure 6:
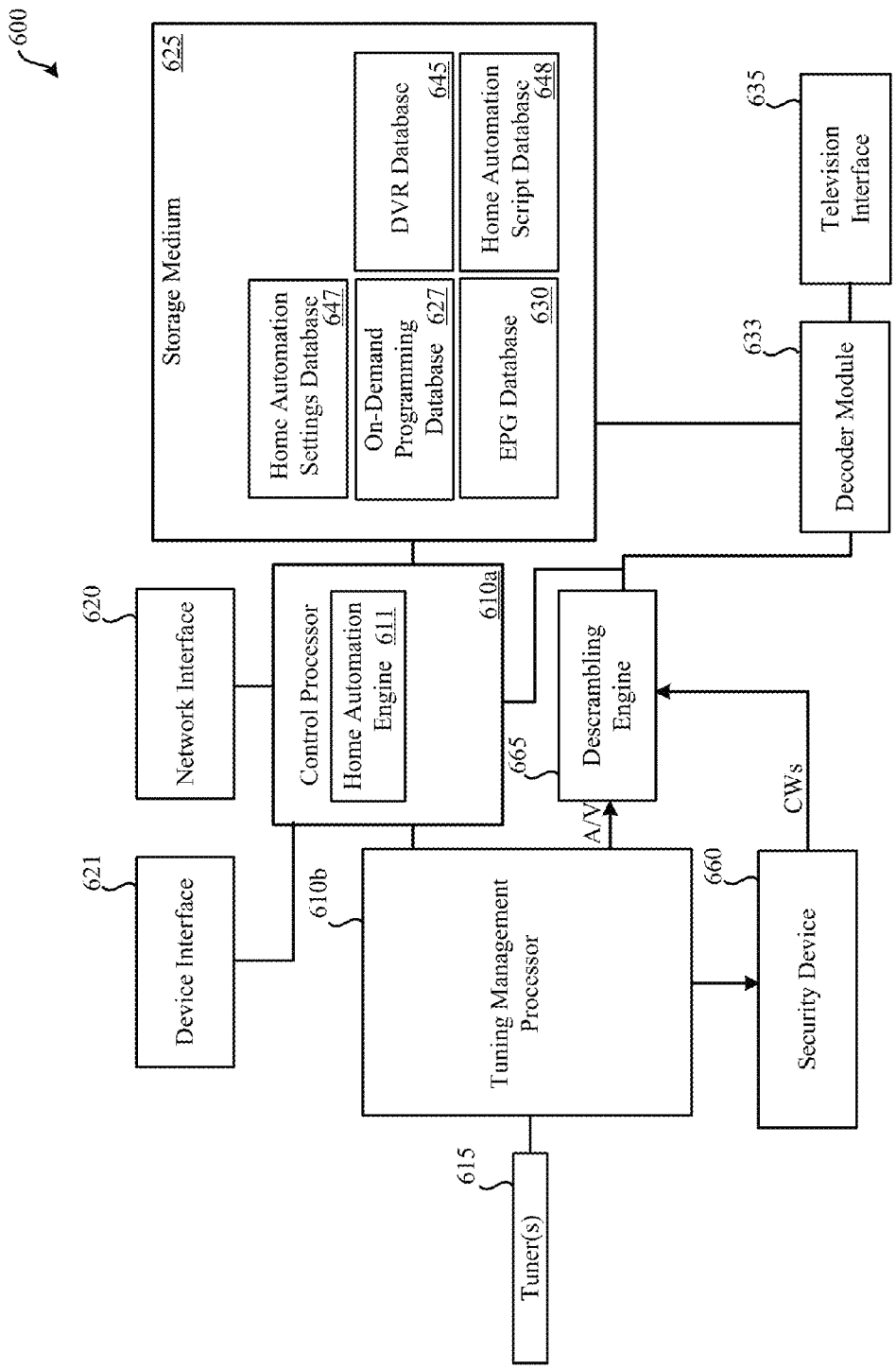
FIG. 6 illustrates an embodiment of a television receiver that functions as a host for a home automation system.

In communication with satellite dish 540 may be one or more television receivers. Television receivers may be configured to decode signals received from satellites 530 via satellite dish 540 for output and presentation via a display device, such as display device 560. A television receiver may be incorporated as part of a television or may be part of a separate device, commonly referred to as a set-top box ("STB"). Television receiver 550 may decode signals received via satellite dish 540 and provide an output to display device 560. On-demand content, such as PPV content, may be stored to a computer-readable storage medium. FIG. 6 provides additional detail of various embodiments of a television receiver. A television receiver is defined to include STBs, and also circuitry having similar functionality that may be incorporated with another device. For instance, circuitry similar to that of a television receiver may be incorporated as part of a television. As such, while FIG. 5 illustrates an embodiment of television receiver 550 as separate from display device 560, it should be understood that, in other embodiments, similar functions may be performed by a television receiver integrated with display device 560. Television receiver 550 may include home automation engine 611, as detailed in relation to FIG. 6.

Display device 560 may be used to present video and/or audio decoded and output by television receiver 550. Television receiver 550 may also output a display of one or more interfaces to display device 560, such as an electronic programming guide ("EPG"). In many embodiments, display device 560 is a television. Display device 560 may also be a monitor, computer, or some other device configured to display video and, possibly, play audio.

Uplink signal 570a represents a signal between satellite transmitter equipment 520 and satellite 530a. Uplink signal 570b represents a signal between satellite transmitter equipment 520 and satellite 530b. Each of uplink signals 570 may contain streams of one or more different television channels. For example, uplink signal 570a may contain a first group of television channels, while uplink signal 570b contains a second group of television channels. Each of these television channels may be scrambled such that unauthorized persons are prevented from accessing the television channels.

Downlink signal 580a represents a signal between satellite 530a and satellite dish 540. Downlink signal 580b represents a signal between satellite 530b and satellite dish 540. Each of downlink signals 580 may contain one or more different television channels, which may be at least partially scrambled. A downlink signal may be in the form of a transponder stream. A single transponder stream may be tuned to at a given time by a tuner of a television receiver. For example, downlink signal 580a may be a first transponder stream containing a first group of television channels, while downlink signal 580b may be a second transponder stream containing a different group of television channels. In addition to or instead of containing television channels, a transponder stream can be used to transmit on-demand content to television receivers, including PPV content, which may be stored locally by the television receiver until output for presentation.

FIG. 5 illustrates downlink signal 580a and downlink signal 580b, being received by satellite dish 540 and distributed to television receiver 550. For a first group of television channels, satellite dish 540 may receive downlink signal 580a and for a second group of channels, downlink signal 580b may be received. Television receiver 550 may decode the received transponder streams. As such, depending on which television channels are desired to be presented or stored, various transponder streams from various satellites may be received, descrambled, and decoded by television receiver 550.

Network 590, which may include the Internet, may allow for bidirectional communication between television receiver 550 and television service provider system 510, such as for home automation related services provided by home automation service server 512. Although illustrated as part of the television service provider system, the home automation service server 512 may be provided by a third party in embodiments. In addition or in alternate to network 590, a telephone, e.g., landline, or cellular connection may be used to enable communication between television receiver 550 and television service provider system 510.

FIG. 6 illustrates an embodiment of a television receiver 600, which may represent television receiver 550 of FIG. 5. Television receiver 600 may be configured to function as a host for a home automation system either alone or in conjunction with a communication device. Television receiver 600 may be in the form of a separate device configured to be connected with a display device, such as a television. Embodiments of television receiver 600 can include STBs. In addition to being in the form of an STB, a television receiver may be incorporated as part of another device, such as a television, other form of display device, video game console, computer, mobile phone or tablet, or the like. For example, a television may have an integrated television receiver, which does not involve an external STB being coupled with the television.

Television receiver 600 may be incorporated as part of a television, such as display device 560 of FIG. 5. Television receiver 600 may include: processors 610, which may include control processor 610a, tuning management processor 610b, and possibly additional processors, tuners 615, network interface 620, non-transitory computer-readable storage medium 625, EPG database 630, television interface 635, digital video recorder ("DVR") database 645, which may include provider-managed television programming storage and/or user-defined television programming, on-demand programming database 627, home automation settings database 647, home automation script database 648, remote control interface 250, security device 660, and/or descrambling engine 665. In other embodiments of television receiver 600, fewer or greater numbers of components may be present. It should be understood that the various components of television receiver 600 may be implemented using hardware, firmware, software, and/or some combination thereof. Functionality of components may be combined; for example, functions of descrambling engine 665 may be performed by tuning management processor 610b. Further, functionality of components may be spread among additional components.

Processors 610 may include one or more specialized and/or general-purpose processors configured to perform processes such as tuning to a particular channel, accessing and displaying EPG information from EPG database 630, and/or receiving and processing input from a user. It should be understood that the functions performed by various modules of FIG. 6 may be performed using one or more processors. As such, for example, functions of descrambling engine 665 may be performed by control processor 610a.

Control processor 610a may communicate with tuning management processor 610b. Control processor 610a may control the recording of television channels based on timers stored in DVR database 645. Control processor 610a may also provide commands to tuning management processor 610b when recording of a television channel is to cease. In addition to providing commands relating to the recording of television channels, control processor 610a may provide commands to tuning management processor 610b that indicate television channels to be output to decoder module 633 for output to a display device. Control processor 610a may also communicate with network interface 620 and remote control interface 250. Control processor 610a may handle incoming data from network interface 620 and remote control interface 250. Additionally, control processor 610a may be configured to output data via network interface 620.

Control processor 610a may include home automation engine 611. Home automation engine 611 may permit television receiver and control processor 610a to provide home automation functionality. Home automation engine 611 may have a JSON ("JavaScript Object Notation") command interpreter or some other form of command interpreter that is configured to communicate with wireless devices via network interface 620 and a message server, possibly via a message server client. Such a command interpreter of home automation engine 611 may also communicate via a local area network with devices without using the Internet. Home automation engine 611 may contain multiple controllers specific to different protocols; for instance, a ZigBee® controller, a Z-Wave® controller, and/or an IP camera controller, wireless LAN, 802.11, may be present. Home automation engine 611 may contain a media server configured to serve streaming audio and/or video to remote devices on a local area network or the Internet. Television receiver may be able to serve such devices with recorded content, live content, and/or content recorded using one or more home automation devices, such as cameras.

Tuners 615 may include one or more tuners used to tune to transponders that include broadcasts of one or more television channels. Such tuners may be used also to receive for storage on-demand content and/or addressable television commercials. In some embodiments, two, three, or more than three tuners may be present, such as four, six, or eight tuners. Each tuner contained in tuners 615 may be capable of receiving and processing a single transponder stream from a satellite transponder or from a cable network at a given time. As such, a single tuner may tune to a single transponder stream at a given time. If tuners 615 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 615 may be used to receive the signal containing the multiple television channels for presentation and/or recording. Tuners 615 may receive commands from tuning management processor 610b. Such commands may instruct tuners 615 to which frequencies are to be tuned.

Network interface 620 may be used to communicate via an alternate communication channel with a television service provider, if such communication channel is available. A communication channel may be via satellite, which may be unidirectional to television receiver 600, and the alternate communication channel, which may be bidirectional, may be via a network, such as the Internet. Data may be transmitted from television receiver 600 to a television service provider system and from the television service provider system to television receiver 600. Information may be transmitted and/or received via network interface 620. For instance, instructions from a television service provider may also be received via network interface 620, if connected with the Internet. Besides the primary communication channel being satellite, cable network, an IP-based network, or broadcast network may be used. Network interface 620 may permit wireless communication with one or more types of networks, including using home automation network protocols and wireless network protocols. Also, wired networks may be connected to and communicated with via network interface 620. Device interface 621 may represent a USB port or some other form of communication port that permits communication with a communication device as will be explained further below.

Storage medium 625 may represent one or more non-transitory computer-readable storage mediums. Storage medium 625 may include memory and/or a hard drive. Storage medium 625 may be used to store information received from one or more satellites and/or information received via network interface 620. Storage medium 625 may store information related to on-demand programming database 627, EPG database 630, DVR database 645, home automation settings database 647, and/or home automation script database 648. Recorded television programs may be stored using storage medium 625 as part of DVR database 645. Storage medium 625 may be partitioned or otherwise divided, such as into folders, such that predefined amounts of storage medium 625 are devoted to storage of television programs recorded due to user-defined timers and stored television programs recorded due to provider-defined timers.

Home automation settings database 647 may allow configuration settings of home automation devices and user preferences to be stored. Home automation settings database 647 may store data related to various devices that have been set up to communicate with television receiver 600. For instance, home automation settings database 647 may be configured to store information on which types of events should be indicated to users, to which users, in what order, and what communication methods should be used. For instance, an event such as an open garage may only be notified to certain wireless devices, e.g., a cellular phone associated with a parent, not a child, notification may be by a third-party notification server, email, text message, and/or phone call. In some embodiments, a second notification method may only be used if a first fails. For instance, if a notification cannot be sent to the user via a third-party notification server, an email may be sent.

Home automation settings database 647 may store information that allows for the configuration and control of individual home automation devices which may operate using Z-Wave® and ZigBee®-specific protocols. To do so, home automation engine 611 may create a proxy for each device that allows for settings for the device to be passed through a UI, e.g., presented on a television, to allow for settings to be solicited for and collected via a user interface presented by television receiver or overlay device. The received settings may then be handled by the proxy specific to the protocol, allowing for the settings to be passed on to the appropriate device. Such an arrangement may allow for settings to be collected and received via a UI of the television receiver or overlay device and passed to the appropriate home automation device and/or used for managing the appropriate home automation device. For example, a piece of exercise equipment that is enabled to interface with the home automation engine 611, such as via device interface 621, may be configured at the electronic device 611 in addition to on the piece of exercise equipment itself. Additionally, a mobile device or application residing on a mobile device and utilized with exercise equipment may be configured in such a fashion as well for displaying received fitness information on a coupled display device.

Home automation script database 648 may store scripts that detail how home automation devices are to function based on various events occurring. For instance, if stored content starts being played back by television receiver 600, lights in the vicinity of display device 560 may be dimmed and shades may be lowered by communicatively coupled and controlled shade controller. As another example, when a user shuts programming off late in the evening, there may be an assumption the user is going to bed. Therefore, the user may configure television receiver 600 to lock all doors via a lock controller, shut the garage door via garage controller, lower a heat setting of thermostat, shut off all lights via a light controller, and determine if any windows or doors are open via window sensors and door sensors, and, if so, alert the user. Such scripts or programs may be predefined by the home automation/television service provider and/or may be defined by a user.

In some embodiments, home automation script database 648 may allow for various music profiles to be implemented. For instance, based on home automation settings within a structure, appropriate music may be played. For instance, when a piece of exercise equipment is connected or is used, energizing music may be played. Conversely, based on the music being played, settings of home automation devices may be determined. If television programming, such as a movie, is output for playback by television receiver 550, a particular home automation script may be used to adjust home automation settings, e.g., lower lights, raise temperature, and lock doors.

EPG database 630 may store information related to television channels and the timing of programs appearing on such television channels. EPG database 630 may be stored using storage medium 625, which may be a hard drive or solid-state drive. Information from EPG database 630 may be used to inform users of what television channels or programs are popular and/or provide recommendations to the user. Information from EPG database 630 may provide the user with a visual interface displayed by a television that allows a user to browse and select television channels and/or television programs for viewing and/or recording. Information used to populate EPG database 630 may be received via network interface 620, via satellite, or some other communication link with a television service provider, e.g., a cable network. Updates to EPG database 630 may be received periodically. EPG database 630 may serve as an interface for a user to control DVR functions of television receiver 600, and/or to enable viewing and/or recording of multiple television channels simultaneously. EPG database 240 may also contain information about on-demand content or any other form of accessible content. Decoder module 633 may serve to convert encoded video and audio into a format suitable for output to a display device. For instance, decoder module 633 may receive MPEG video and audio from storage medium 625 or descrambling engine 665 to be output to a television. Moving Picture Experts Group ("MPEG") video and audio format from storage medium 625 may have been recorded to DVR database 645 as part of a previously-recorded television program. Decoder module 633 may convert the MPEG video and audio into a format appropriate to be displayed by a television or other form of display device and audio into a format appropriate to be output from speakers, respectively. Decoder module 633 may have the ability to convert a finite number of television channel streams received from storage medium 625 or descrambling engine 665, simultaneously. For instance, decoders within decoder module 633 may be able to only decode a single television channel at a time. Decoder module 633 may have various numbers of decoders.

Television interface 635 may serve to output a signal to a television or another form of display device in a proper format for display of video and playback of audio. As such, television interface 635 may output one or more television channels, stored television programming from storage medium 625, e.g., television programs from DVR database 645, television programs from on-demand programming 630 and/or information from EPG database 630, to a television for presentation. Television interface 635 may also serve to output a CVM.

DVR functionality may permit a television channel to be recorded for a period of time. DVR functionality of television receiver 600 may be managed by control processor 610a. Control processor 610a may coordinate the television channel, start time, and stop time of when recording of a television channel is to occur. DVR database 645 may store information related to the recording of television channels. DVR database 645 may store timers that are used by control processor 610a to determine when a television channel should be tuned to and its programs recorded to DVR database 645 of storage medium 625. In some embodiments, a limited amount of storage medium 625 may be devoted to DVR database 645. Timers may be set by the television service provider and/or one or more users of television receiver 600.

DVR database 645 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created; one for each television channel. Within each file, one or more television programs may be present. The service provider may define the television channels, the dates, and the time periods for which the television channels are recorded for the provider-defined timers. The provider-defined timers may be transmitted to television receiver 600 via the television provider's network. For example, in a satellite-based television service provider system, data necessary to create the provider-defined timers at television receiver 550 may be received via satellite.

On-demand programming database 627 may store additional television programming. On-demand programming database 627 may include television programming that was not recorded to storage medium 625 via a timer, either user- or provider-defined. Rather, on-demand programming may be programming provided to the television receiver directly for storage by the television receiver and for later presentation to one or more users. On-demand programming may not be user-selected. As such, the television programming stored to on-demand programming database 627 may be the same for each television receiver of a television service provider. On-demand programming database 627 may include pay-per-view ("PPV") programming that a user must pay and/or use an amount of credits to view. For instance, on-demand programming database 627 may include movies that are not available for purchase or rental yet.

Referring back to tuners 615, television channels received via satellite or cable may contain at least some scrambled data. Packets of audio and video may be scrambled to prevent unauthorized users, e.g., nonsubscribers, from receiving television programming without paying the television service provider. When a tuner of tuners 615 is receiving data from a particular transponder of a satellite, the transponder stream may be a series of data packets corresponding to multiple television channels. Each data packet may contain a packet identifier ("PID"), which can be determined to be associated with a particular television channel. Particular data packets, referred to as entitlement control messages ("ECMs"), may be periodically transmitted. ECMs may be associated with another PID and may be encrypted; television receiver 600 may use decryption engine 261 of security device 660 to decrypt ECMs. Decryption of an ECM may only be possible if the user has authorization to access the particular television channel associated with the ECM. When an ECM is determined to correspond to a television channel being stored and/or displayed, the ECM may be provided to security device 660 for decryption.

When security device 660 receives an encrypted ECM, security device 660 may decrypt the ECM to obtain some number of control words. In some embodiments, from each ECM received by security device 660, two control words are obtained. In some embodiments, when security device 660 receives an ECM, it compares the ECM to the previously received ECM. If the two ECMs match, the second ECM is not decrypted because the same control words would be obtained. In other embodiments, each ECM received by security device 660 is decrypted; however, if a second ECM matches a first ECM, the outputted control words will match; thus, effectively, the second ECM does not affect the control words output by security device 660. Security device 660 may be permanently part of television receiver 600 or may be configured to be inserted and removed from television receiver 600, such as a smart card, cable card, or the like.

Tuning management processor 610b may be in communication with tuners 615 and control processor 610a. Tuning management processor 610b may be configured to receive commands from control processor 610a. Such commands may indicate when to start/stop receiving and/or recording of a television channel and/or when to start/stop causing a television channel to be output to a television. Tuning management processor 610b may control tuners 615. Tuning management processor 610b may provide commands to tuners 615 that instruct the tuners which satellite, transponder, and/or frequency to tune to. From tuners 615, tuning management processor 610b may receive transponder streams of packetized data.

Descrambling engine 665 may use the control words output by security device 660 in order to descramble video and/or audio corresponding to television channels for storage and/or presentation. Video and/or audio data contained in the transponder data stream received by tuners 615 may be scrambled. Video and/or audio data may be descrambled by descrambling engine 665 using a particular control word. Which control word output by security device 660 to be used for successful descrambling may be indicated by a scramble control identifier present within the data packet containing the scrambled video or audio. Descrambled video and/or audio may be output by descrambling engine 665 to storage medium 625 for storage, in DVR database 645, and/or to decoder module 633 for output to a television or other presentation equipment via television interface 635.

In some embodiments, the television receiver 600 may be configured to periodically reboot in order to install software updates downloaded over the network 590 or satellites 530. Such reboots may occur for example during the night when the users are likely asleep and not watching television. If the system utilizes a single processing module to provide television receiving and home automation functionality, then the security functions may be temporarily deactivated. In order to increase the security of the system, the television receiver 600 may be configured to reboot at random times during the night in order to allow for installation of updates. Thus, an intruder is less likely to guess the time when the system is rebooting. In some embodiments, the television receiver 600 may include multiple processing modules for providing different functionality, such as television receiving functionality and home automation, such that an update to one module does not necessitate reboot of the whole system. In other embodiments, multiple processing modules may be made available as a primary and a backup during any installation or update procedures.

For simplicity, television receiver 600 of FIG. 6 has been reduced to a block diagram; commonly known parts, such as a power supply, have been omitted. Further, some routing between the various modules of television receiver 600 has been illustrated. Such illustrations are for exemplary purposes only. The state of two modules not being directly or indirectly connected does not indicate the modules cannot communicate. Rather, connections between modules of the television receiver 600 are intended only to indicate possible common data routing. It should be understood that the modules of television receiver 600 may be combined into a fewer number of modules or divided into a greater number of modules. Further, the components of television receiver 600 may be part of another device, such as built into a television. Television receiver 600 may include one or more instances of various computerized components, such as disclosed in relation to computer system 700 of FIG. 7.

While the television receiver 600 has been illustrated as a satellite-based television receiver, it is to be appreciated that techniques below may be implemented in other types of television receiving devices, such a cable receivers, terrestrial receivers, IPTV receivers or the like. In some embodiments, the television receiver 600 may be configured as a hybrid receiving device, capable of receiving content from disparate communication networks, such as satellite and terrestrial television broadcasts. In some embodiments, the tuners may be in the form of network interfaces capable of receiving content from designated network locations. The home automation functions of television receiver 600 may be performed by an overlay device. If such an overlay device is used, television programming functions may still be provided by a television receiver that is not used to provide home automation functions.

Figure 7:
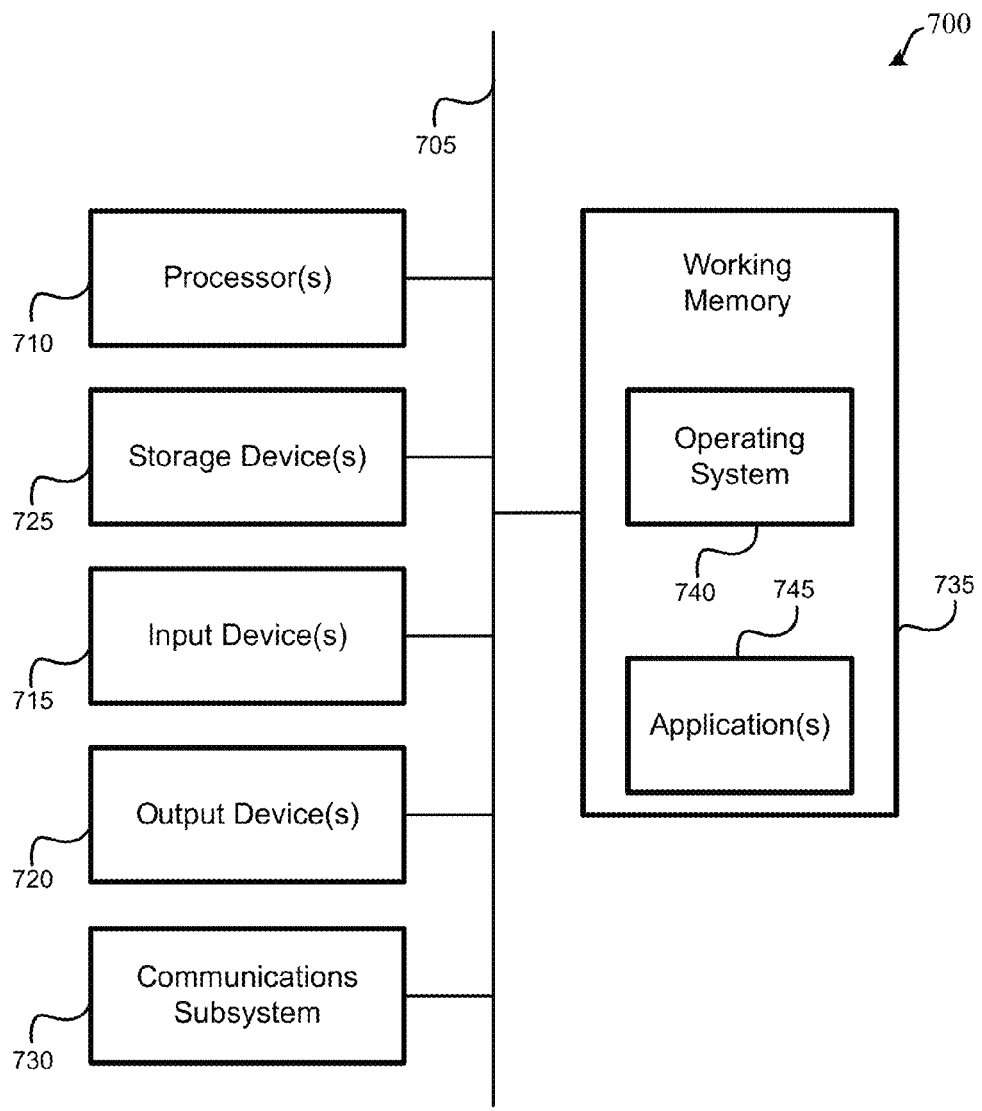
FIG. 7 illustrates an embodiment of a computer system.

FIG. 7 illustrates an embodiment of a computer system 700. A computer system 700 as illustrated in FIG. 7 may be incorporated into devices such as an STB, DVR, television, media system, personal computer, and the like. Moreover, some or all of the components of the computer system 700 may also be incorporated into a portable electronic device, mobile phone, or other device as described herein. FIG. 7 provides a schematic illustration of one embodiment of a computer system 700 that can perform some or all of the steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include without limitation a mouse, a keyboard, a camera, and/or the like; and one or more output devices 720, which can include without limitation a display device, a printer, and/or the like.

The computer system 700 may further include and/or be in communication with one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 730. In other embodiments, a portable electronic device may be incorporated into the computer system 700, e.g., an electronic device or STB, as an input device 715. In many embodiments, the computer system 700 will further comprise a working memory 735, which can include a RAM or ROM device, as described above.

The computer system 700 also can include software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 3 or 4, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the procedures of such methods are performed by the computer system 700 in response to processor 710 executing one or more sequences of one or more instructions, which might be incorporated into the operating system 740 and/or other code, such as an application program 745, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for automatically selecting a television channel, the method comprising:
   receiving, by a controller, an indication of a plurality of users being located at a premises having a plurality of televisions;
   accessing, by the controller, a database containing viewing preferences for each of the plurality of users;
   generating, by the controller, a ranked list of television channels to display based on the viewing preferences for each of the plurality of users;
   assigning, by the controller, each television in the plurality of televisions a television channel from the ranked list of television channels in ranked order, the assigning comprising:
      identifying, by the controller, a first subset of the plurality of users having a line of sight to a first television of the plurality of televisions and a second subset of the plurality of users having a line of sight to a second television of the plurality of televisions,
      assigning, by the controller, a first television channel from the ranked list of television channels to the first television by determining the first television channel from the ranked list of television channels that ranks highest based on the viewing preferences for the first subset of the plurality of users, and
      assigning, by the controller, a second television channel from the ranked list of television channels to the second television by determining the second television channel from the ranked list of television channels that ranks highest based on the viewing preferences for the second subset of the plurality of users; and
   sending, by the controller, an instruction to a television receiver associated with the plurality of televisions to set the assigned television channel for display on each of the plurality of televisions.

2. The method for automatically selecting a television channel of claim 1, further comprising:
   identifying, by the controller, that a program of the first television channel is ending;
   requesting, by the controller, an updated plurality of users located at the premises;
   identifying, by the controller, a new subset of the updated plurality of users having a line of sight to the first television of the plurality of televisions;
   determining, by the controller, based on the viewing preferences of the new subset of the updated plurality of users, a different television channel to display on the first television; and
   sending, by the controller, a second instruction to the television receiver to set the different television channel for display on the first television.

3. The method for automatically selecting a television channel of claim 1, further comprising:
   identifying, by the controller, that a program of the first television channel being displayed on the first television is ending;
   requesting, by the controller, an updated plurality of users located at the premises;
   generating, by the controller, a second ranked list of television channels to display based on the viewing preferences for each of the updated plurality of users;
   determining, by the controller, a highest ranked television channel from the second ranked list of television channels not being displayed on any of the other televisions from the plurality of televisions; and
   sending, by the controller, a second instruction to the television receiver to set the determined highest ranked television channel for display on the first television.

4. The method for automatically selecting a television channel of claim 1, further comprising:
   identifying, by the controller, that a program of the first television channel displayed on the first television of the plurality of televisions is beginning a commercial break;
   sending, by the controller, a second instruction to the television receiver that instructs the television receiver to change the first television channel displayed on the first television to a different television channel selected based on excitement data; and
   upon identifying a commercial break beginning on the different television channel, sending, by the controller, a third instruction to the television receiver that instructs the television receiver to change the different second television channel displayed on the first television back to the first television channel.

5. The method for automatically selecting a television channel of claim 1, wherein the first television channel is selected based on viewing preferences including a favorite sports team of at least one user.

6. The method for automatically selecting a television channel of claim 1, wherein the first television channel is selected based on viewing preferences including one or more favorite players of at least one user.

7. The method for automatically selecting a television channel of claim 6, wherein, for one or more of the at least one user, the one or more favorite players are identified based on a fantasy sports team of the one or more of the at least one user.

8. The method for automatically selecting a television channel of claim 1, wherein the first television channel is selected based on viewing preferences including one or more identified sporting games of at least one user, the one or more identified sporting games being identified based on a gambling pool or bet placed by the one or more of the at least one user.

9. The method for automatically selecting a television channel of claim 1, further comprising:
 weighting the viewing preferences for each of the plurality of users based on payment of a subscription.

10. A system for automatically selecting a television channel, the system comprising:
 a television receiver associated with a plurality of televisions within a sports bar;
 a database having viewing preferences for a plurality of users; and
 a controller, comprising:
  a processor; and
  a memory having stored thereon instructions that, when executed by the processor, cause the processor to:
   receive a communication generated based on a device of each user of a subset of the plurality of users, each communication including a notification of the associated user being at the sports bar and an indication of a profile of the associated user stored in the database with the associated user's viewing preferences;
   access the database for the viewing preferences of the subset of the plurality of users;
   determine, based on the viewing preferences of the subset of the plurality of users, a ranked list of television channels to display based on the viewing preferences for each of the subset of the plurality of users;
   assign each television in the plurality of televisions a television channel from the ranked list of television channels in ranked order, the assigning comprising:
    identifying a first group of the subset of the plurality of users having a line of sight to a first television of the plurality of televisions and a second group of the subset of the plurality of users having a line of sight to a second television of the plurality of televisions,
    assigning a first television channel from the ranked list of television channels to the first television by determining the first television channel from the ranked list of television channels that ranks highest based on the viewing preferences for the first group of the subset of the plurality of users, and
    assigning, by the controller, a second television channel from the ranked list of television channels to the second television by determining the second television channel from the ranked list of television channels that ranks highest based on the viewing preferences for the second group of the subset of the plurality of users; and
   send an instruction to the television receiver to set the assigned television channel for display on each of the plurality of televisions.

11. The system for automatically selecting a television channel of claim 10, wherein the memory of the controller has stored thereon further instructions that, when executed by the processor of the controller, cause the processor of the controller to:
 identify that a program of a first television channel being displayed on a first television of the plurality of televisions is ending;
 request an updated plurality of users located at the sports bar;
 generate a second ranked list of television channels to display based on the viewing preferences for each of the updated plurality of users;
 determine a highest ranked television channel from the second ranked list of television channels not being displayed on any of the other televisions from the plurality of televisions; and
 send a second instruction to the television receiver to set the determined highest ranked television channel for display on the first television.

12. The system for automatically selecting a television channel of claim 10, further comprising:
 a radio frequency identification ("RFID") reader, wherein the RFID reader is at the sports bar and configured to receive the communication from each device from the subset of the plurality of users, and transmit the received communication to the controller.

13. The system for automatically selecting a television channel of claim 10, wherein the memory of the controller has stored thereon further instructions that, when executed by the processor of the controller, cause the processor of the controller to:
 weight the viewing preferences for each of the plurality of users based on payment of a subscription.

14. A processor readable memory device having stored thereon instructions that, when executed by one or more processors, cause the one or more processors to:
 receive a communication generated based on a device of each user of a subset of a plurality of users, each communication including a notification of the associated user being at a sports bar and an indication of a profile of the associated user stored in a database of viewing preferences of the plurality of users;
 determine, based on the viewing preferences of the subset of the plurality of users, a ranked list of television channels to display;
 assign each television in a plurality of televisions at the sports bar a television channel from the ranked list of television channels in ranked order, the assign comprising:
  identify a first group of the subset of the plurality of users having a line of sight to a first television of the plurality of televisions and a second group of the subset of the plurality of users having a line of sight to a second television of the plurality of televisions,
  assign a first television channel from the ranked list of television channels to the first television by determining the first television channel from the ranked list of television channels that ranks highest based on the viewing preferences for the first group of the subset of the plurality of users, and
  assign a second television channel from the ranked list of television channels to the second television by determining the second television channel from the ranked list of television channels that ranks highest based on the viewing preferences for the second group of the subset of the plurality of users; and send an instruction to a television receiver to set the assigned television channel to display on each of the plurality of televisions.

15. The processor readable memory device of claim 14, comprising further instructions that, when executed by the one or more processors, further cause the one or more processors to:
identify that a program of the first television channel being displayed on the first television of the plurality of televisions is ending;
request an updated plurality of users located at the sports bar;
generate a second ranked list of television channels to display based on the viewing preferences for each of the updated plurality of users;
determine a highest ranked television channel from the second ranked list of television channels not being displayed on any of the other televisions from the plurality of televisions; and
send a second instruction to the television receiver to set the determined highest ranked television channel for display on the first television.

16. The processor readable memory device of claim 14, comprising further instructions that, when executed by the one or more processors, further cause the one or more processors to:
weight the viewing preferences for each of the plurality of users based on payment of a subscription.

* * * * *

UNITED STATES PATENT AND TRADEMARK OFFICE
CERTIFICATE OF CORRECTION

PATENT NO. : 10,021,448 B2
APPLICATION NO. : 15/359359
DATED : July 10, 2018
INVENTOR(S) : Max Stephen Gratton and Christopher Boyd Tirpak Page 1 of 1

It is certified that error appears in the above-identified patent and that said Letters Patent is hereby corrected as shown below:

In the Claims

Column 24, Claim 4, Line 58, please delete "second"

Signed and Sealed this
Second Day of October, 2018

Andrei Iancu
*Director of the United States Patent and Trademark Office*